US011973763B1

(12) United States Patent
Carru et al.

(10) Patent No.: US 11,973,763 B1
(45) Date of Patent: Apr. 30, 2024

(54) EVENTS ACCOUNT FOR NATIVE APP EVENT SHARING

(71) Applicant: Snowflake Inc., Bozeman, MT (US)

(72) Inventors: Damien Carru, New York, NY (US); Pui Kei Johnston Chu, Unionville (CA); Unmesh Jagtap, San Mateo, CA (US); Xiaodi Ke, Markham (CA); Subramanian Muralidhar, Mercer Island, WA (US); James Pan, Oakville (CA)

(73) Assignee: SNOWFLAKE INC., Bozeman, MT (US)

( * ) Notice: Subject to any disclaimer, the term of this patent is extended or adjusted under 35 U.S.C. 154(b) by 0 days.

(21) Appl. No.: 18/127,576

(22) Filed: Mar. 28, 2023

(51) Int. Cl.
*H04L 9/40* (2022.01)
*G06F 11/07* (2006.01)
*G06F 16/23* (2019.01)
*H04L 67/125* (2022.01)
*H04L 67/30* (2022.01)

(52) U.S. Cl.
CPC .......... *H04L 63/102* (2013.01); *G06F 11/079* (2013.01); *G06F 16/235* (2019.01); *H04L 67/125* (2013.01); *H04L 67/30* (2013.01)

(58) Field of Classification Search
CPC ... H04L 63/101; H04L 67/53; H04L 67/1095; H04L 63/104; H04L 63/102; H04L 63/107; H04L 67/1097; H04L 63/10; H04L 67/51; H04L 41/5096; H04L 67/10; H04L 63/20; H04L 63/0272; G06F 21/6272; G06F 16/2379; G06F 16/235; G06F 11/1471; G06F 16/2282; G06F 11/1451; G06F 16/2358; G06F 16/219; G06F 11/079; G06F 11/3476; G06F 11/36; G06F 11/3024; G06F 11/3017; G06F 11/3006; G06F 11/0715; G06F 11/0709
See application file for complete search history.

(56) References Cited

U.S. PATENT DOCUMENTS

| 10,999,355 B1 * | 5/2021 | Chu ...................... H04L 63/102 |
| 2017/0161166 A1 * | 6/2017 | Shivaprasad ......... G06F 11/079 |
| 2020/0364201 A1 * | 11/2020 | Cseri ..................... G06F 16/235 |

* cited by examiner

*Primary Examiner* — Kyung H Shin
(74) *Attorney, Agent, or Firm* — Womble Bond Dickinson (US) LLP

(57) ABSTRACT

Embodiments of the present disclosure provide a region-specific events account that is used as a central place to store the events shared by consumers of shared applications in that region. Use of such an account helps reduce the operational burden of a provider of the applications as they do not need to determine which accounts have shared events for each different consumer. The provider only needs to login to the events account which is in the same region as the consumer and can query all shared events from different applications that are being used in that region. Also, since the provider can designate an events account in each region, the shared events could be directly ingested into the events account without traveling to a different region.

24 Claims, 14 Drawing Sheets

US 11,973,763 B1

EVENTS ACCOUNT FOR NATIVE APP EVENT SHARING

TECHNICAL FIELD

The present disclosure relates to native applications shared via data sharing platforms, and particularly to sharing events and metrics related to usage of native applications shared via data sharing platforms using region specific events accounts.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
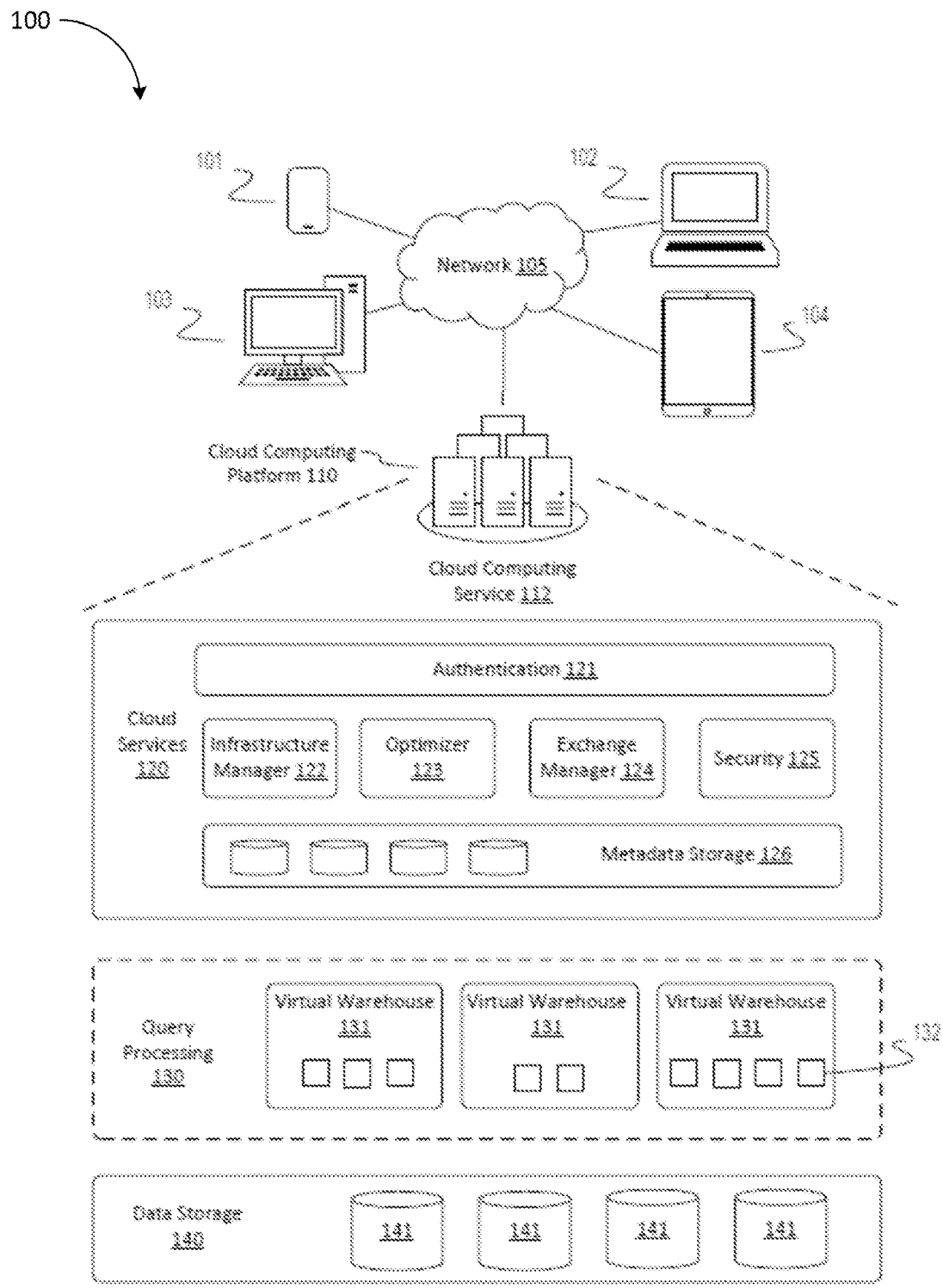
FIG. 1A is a block diagram depicting an example computing environment in which the methods disclosed herein may be implemented, in accordance with some embodiments of the present invention.

Data providers often have data assets that are cumbersome to share. A data asset may be data that is of interest to another entity. For example, a large online retail company may have a data set that includes the purchasing habits of millions of consumers over the last ten years. This data set may be large. If the online retailer wishes to share all or a portion of this data with another entity, the online retailer may need to use old and slow methods to transfer the data, such as a file-transfer-protocol (FTP), or even copying the data onto physical media and mailing the physical media to the other entity. This has several disadvantages. First, it is slow as copying terabytes or petabytes of data can take days. Second, once the data is delivered, the provider cannot control what happens to the data. The recipient can alter the data, make copies, or share it with other parties. Third, the only entities that would be interested in accessing such a large data set in such a manner are large corporations that can afford the complex logistics of transferring and processing the data as well as the high price of such a cumbersome data transfer. Thus, smaller entities (e.g., "mom and pop" shops) or even smaller, more nimble cloud-focused startups are often priced out of accessing this data, even though the data may be valuable to their businesses. This may be because raw data assets are generally too unpolished and full of potentially sensitive data to simply outright sell/provide to other companies. Data cleaning, de-identification, aggregation, joining, and other forms of data enrichment need to be performed by the owner of data before it is shareable with another party. This is time-consuming and expensive. Finally, it is difficult to share data assets with many entities because traditional data sharing methods do not allow scalable sharing for the reasons mentioned above. Traditional sharing methods also introduce latency and delays in terms of all parties having access to the most recently updated data.

Private and public data exchanges may allow data providers to more easily and securely share their data assets with other entities. A public data exchange (also referred to herein as a "Snowflake data marketplace," or a "data marketplace") may provide a centralized repository with open access where a data provider may publish, and control live and read-only data sets to thousands of consumers. A private data exchange (also referred to herein as a "data exchange") may be under the data provider's brand, and the data provider may control who can gain access to it. The data exchange may be for internal use only, or may also be opened to consumers, partners, suppliers, or others. The data provider may control what data assets are listed as well as control who has access to which sets of data. This allows for a seamless way to discover and share data both within a data provider's organization and with its business partners.

The data exchange may be facilitated by a cloud computing service such as the SNOWFLAKE™ cloud computing service and allows data providers to offer data assets directly from their own online domain (e.g., website) in a private online marketplace with their own branding. The data exchange may provide a centralized, managed hub for an entity to list internally or externally shared data assets, inspire data collaboration, and also to maintain data governance and to audit access. With the data exchange, data providers may be able to share data without copying it between companies. Data providers may invite other entities to view their data listings, control which data listings appear in their private online marketplace, control who can access data listings and how others can interact with the data assets connected to the listings. This may be thought of as a "walled garden" marketplace, in which visitors to the garden must be approved and access to certain listings may be limited.

As an example, Company A may be a consumer data company that has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities. For example, a new clothing brand may wish to access data sets related to consumer clothing purchases and online shopping habits. Company A may support a page on its website that is or functions substantially similar to a data exchange, where a data consumer (e.g., the new clothing brand) may browse, explore, discover, access and potentially purchase data sets directly from Company A. Further, Company A may control: who can enter the data exchange, the entities that may view a particular listing, the actions that an entity may take with respect to a listing (e.g., view only), and any other suitable action. In addition, a data provider may combine its own data with other data sets from, e.g., a public data exchange (also referred to as a "data marketplace") and create new listings using the combined data.

A data exchange may be an appropriate place to discover, assemble, clean, and enrich data to make it more monetizable. A large company on a data exchange may assemble data from across its divisions and departments, which could become valuable to another company. In addition, participants in a private ecosystem data exchange may work together to join their datasets together to jointly create a useful data product that any one of them alone would not be able to produce. Once these joined datasets are created, they may be listed on the data exchange or on the data marketplace.

Sharing data may be performed when a data provider creates a share object (hereinafter referred to as a share) of a database in the data provider's account and grants the share access to particular objects (e.g., tables, secure views, and secure user-defined functions (UDFs)) of the database. Then, a read-only database may be created using information provided in the share. Access to this database may be controlled by the data provider. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. The consumer accounts with which the database and its objects are shared may be indicated by a list of references to those consumer accounts contained within the share object. Only those consumer accounts that are specifically listed in the share object may be allowed to look up, access, and/or import from this share object. By modifying the list of references of other consumer accounts, the share object can be made accessible to more accounts or be restricted to fewer accounts.

In some embodiments, each share object contains a single role. Grants between this role and objects define what objects are being shared and with what privileges these objects are shared. The role and grants may be similar to any other role and grant system in the implementation of role-based access control. By modifying the set of grants attached to the role in a share object, more objects may be shared (by adding grants to the role), fewer objects may be shared (by revoking grants from the role), or objects may be shared with different privileges (by changing the type of grant, for example to allow write access to a shared table object that was previously read-only). In some embodiments, share objects in a provider account may be imported into the target consumer account using alias objects and cross-account role grants.

When data is shared, no data is copied or transferred between users. Sharing is accomplished through the cloud computing services of a cloud computing service provider such as SNOWFLAKE™. Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share).

A data exchange may also implement role-based access control to govern access to objects within consumer accounts using account level roles and grants. In one embodiment, account level roles are special objects in a consumer account that are assigned to users. Grants between these account level roles and database objects define what privileges the account level role has on these objects. For example, a role that has a usage grant on a database can "see" this database when executing the command "show databases"; a role that has a select grant on a table can read from this table but not write to the table. The role would need to have a modify grant on the table to be able to write to it.

Because consumers of data often require the ability to perform various functions on data that has been shared with them, a data exchange may enable users of a data marketplace to build native applications that can be shared with other users of the data marketplace. The native applications can be published and discovered in the data marketplace like any other data listing, and consumers can install them in their local data marketplace account to serve their data processing needs. This helps to bring data processing services and capabilities to consumers instead of requiring a consumer to share data with e.g., a service provider who can perform these data processing services and share the processed data back to the consumer. Stated differently, instead of a consumer having to share potentially sensitive data with a third party who can perform the necessary data processing services and send the results back to the consumer, the desired data processing functionality may be encapsulated, and then shared with the consumer so that the consumer does not have to share their potentially sensitive data.

Monitoring native applications running in consumer accounts is important both for providers and consumers. Providers want to support their applications running in consumer accounts by having access to execution information of their applications. Execution information may include execution logs, trace events and usage metrics. The execution information can help a provider understand how consumers use their shared applications. In addition, when a provider shares an application (e.g., by creating a listing for it in the data exchange), they may include usage metrics in the metadata of the listing so that consumers will have visibility into the resources consumed by the application and can set quotas to adequately budget for the required resource consumption. For example, the provider may provide an indication of the resources (e.g., compute, storage resources) required to run the application in the listing metadata and any consumers interested in the application may set their respective quotas accordingly.

On the consumer side, consumers may wish to engage in first level debugging and management of applications by having access to execution logs and trace events from the application. Being able to audit the execution logs and trace events and being able to selectively share this information is a key security control available to consumers.

A native applications framework may monitor execution of a shared application to obtain execution information (also referred to herein as event sharing) including execution logs, trace events, and usage metrics, and provide this execution information to a provider account (and/or consumer account). Each account (consumer or provider) of the deployment may include an event table which may be used to store execution information generated by applications they are sharing or consuming.

However, logging events in this way can result in significant data transfer costs when the provider account and the consumer account reside in different regions (i.e., event sharing must be performed cross-region). In addition, logging events as described above can implicate data sovereignty requirements from both the provider and the consumer. For example, if providers and/or consumers have very strict data residency requirements, they cannot enable the event sharing feature if they are in different regions. In addition, if a provider has multiple listing accounts, the shared events from consumers in different regions will be spread across those listing accounts and the provider must figure out which of their listing accounts to login to when investigating a particular consumer's issues. This problem is compounded if a consumer uses applications from different listings at the same time, because the provider must switch between different listing accounts.

Embodiments of the present disclosure provide a region-specific events account that is used as a central place to store the events shared by consumers in that region. This helps reduce the operational burden of the provider as they don't need to figure out which accounts have shared events for each different consumer. The provider only needs to login to the events account which is in the same region as the consumer and can query all shared events from different applications that are being used in that region. Also, since the provider can designate an events account in each region, the shared events could be directly ingested into the events account without traveling to a different region.

FIG. 1A is a block diagram of an example computing environment 100 in which the systems and methods disclosed herein may be implemented. A cloud computing platform 110 may be implemented, such as Amazon Web Services™ (AWS), Microsoft Azure™, Google Cloud™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g., data management and access) and analysis functions (e.g. SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as Amazon S3™ to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, a data load which takes fifteen hours on a system with four nodes might take only two hours with thirty-two nodes.

Cloud services 120 may be a collection of services that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security engine 125, and metadata storage 126.

Figure 1B:
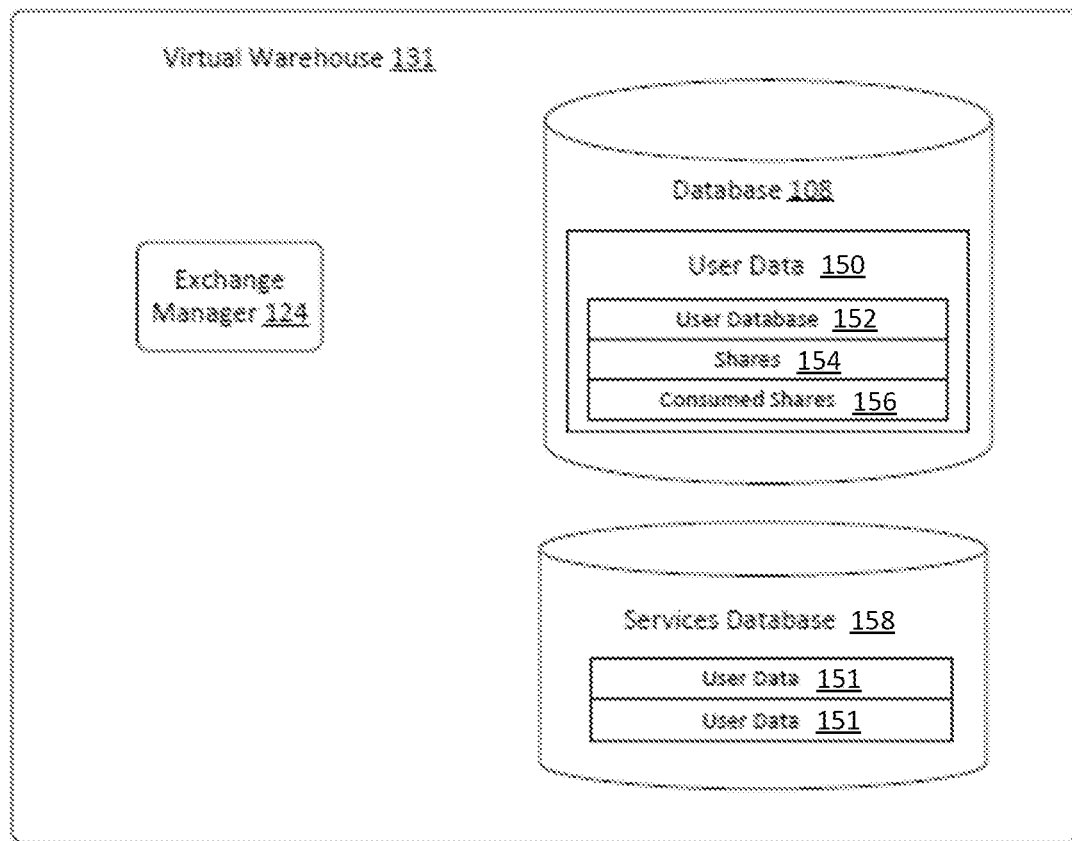
FIG. 1B is a block diagram illustrating an example virtual warehouse, in accordance with some embodiments of the present invention.

FIG. 1B is a block diagram illustrating an example virtual warehouse 131. The exchange manager 124 may facilitate the sharing of data between data providers and data consumers, using, for example, a data exchange. For example, cloud computing service 112 may manage the storage and access of a database 108. The database 108 may include various instances of user data 150 for different users e.g., different enterprises or individuals. The user data 150 may include a user database 152 of data stored and accessed by that user. The user database 152 may be subject to access controls such that only the owner of the data is allowed to change and access the user database 152 upon authenticating with the cloud computing service 112. For example, data may be encrypted such that it can only be decrypted using decryption information possessed by the owner of the data. Using the exchange manager 124, specific data from a user database 152 that is subject to these access controls may be shared with other users in a controlled manner. In particular, a user may specify shares 154 that may be shared in a public or data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud services 120 of cloud computing service 112.

Sharing data may be performed when a data provider creates a share of a database in the data provider's account and grants access to particular objects (e.g., tables, secure views, and secure user-defined functions (UDFs)). Then a read-only database may be created using information provided in the share. Access to this database may be controlled by the data provider.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share). A secure join may be performed as described in U.S. application Ser. No. 16/368,339, filed Mar. 28, 2019.

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network.

In the description below, actions are ascribed to users, particularly consumers and providers. Such actions shall be understood to be performed with respect to devices 101-104 operated by such users. For example, notification to a user may be understood to be a notification transmitted to devices 101-104, an input or instruction from a user may be understood to be received by way of the user's devices 101-104, and interaction with an interface by a user shall be understood to be interaction with the interface on the user's devices 101-104. In addition, database operations (joining, aggregating, analysis, etc.) ascribed to a user (consumer or provider) shall be understood to include performing of such actions by the cloud computing service 112 in response to an instruction from that user.

Figure 2:
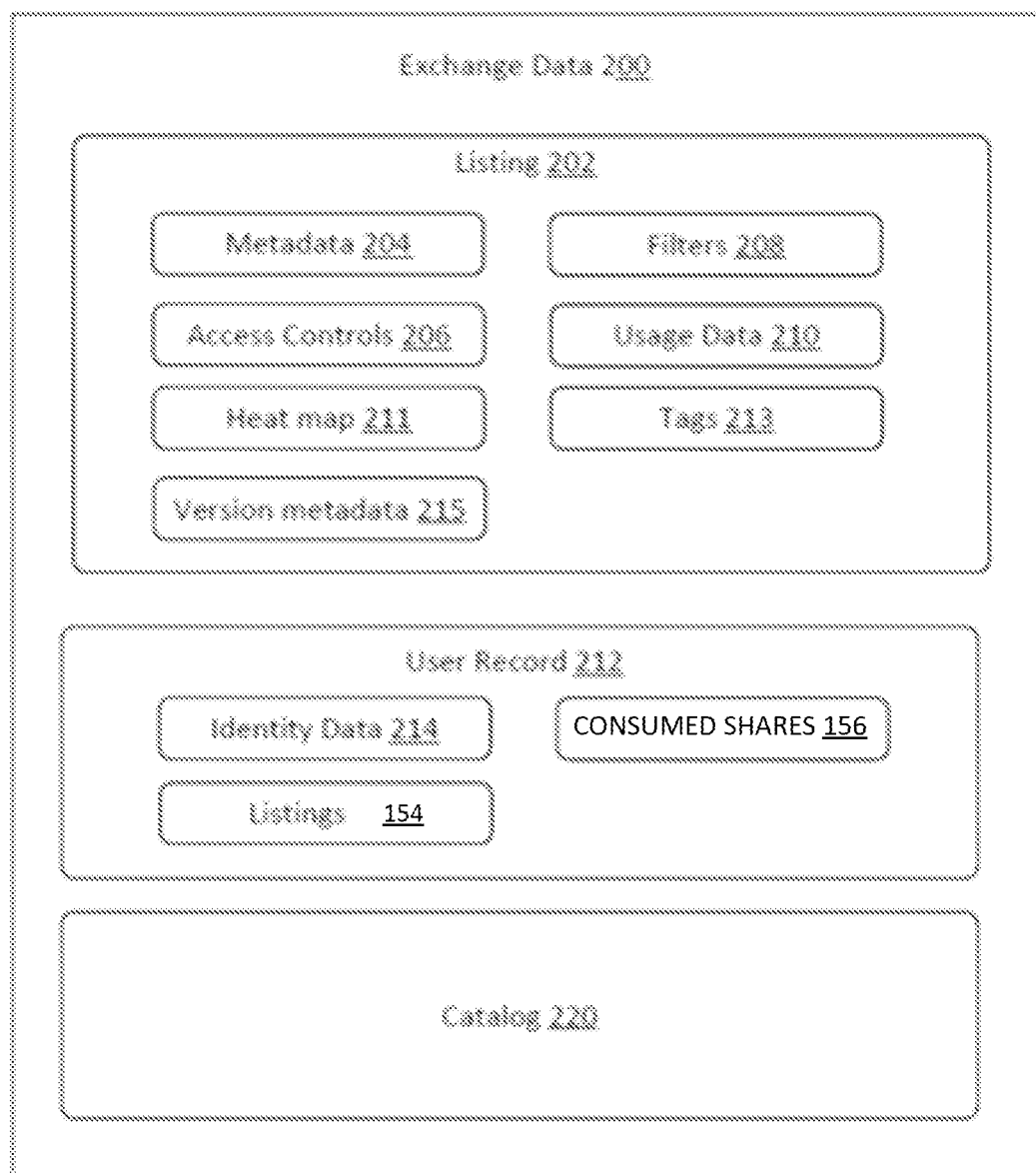
FIG. 2 is a schematic block diagram of data that may be used to implement a public or private data exchange, in accordance with some embodiments of the present invention.

FIG. 2 is a schematic block diagram of data that may be used to implement a public or private data exchange in accordance with an embodiment of the present invention.

The exchange manager 124 may operate with respect to some or all of the illustrated exchange data 200, which may be stored on the platform executing the exchange manager 124 (e.g., the cloud computing platform 110) or at some other location. The exchange data 200 may include a plurality of listings 202 describing data that is shared by a first user ("the provider"). The listings 202 may be listings in a data exchange or in a data marketplace. The access controls, management, and governance of the listings may be similar for both a data marketplace and a data exchange.

The listing 202 may include access controls 206, which may be configurable to any suitable access configuration. For example, access controls 206 may indicate that the shared data is available to any member of the private exchange without restriction (an "any share" as used elsewhere herein). The access controls 206 may specify a class of users (members of a particular group or organization) that are allowed to access the data and/or see the listing. The access controls 206 may specify that a "point-to-point" share in which users may request access but are only allowed access upon approval of the provider. The access controls 206 may specify a set of user identifiers of users that are excluded from being able to access the data referenced by the listing 202.

Note that some listings 202 may be discoverable by users without further authentication or access permissions whereas actual accesses are only permitted after a subsequent authentication step. The access controls 206 may specify that a listing 202 is only discoverable by specific users or classes of users.

Note also that a default function for listings 202 is that the data referenced by the share is not exportable by the consumer. Alternatively, the access controls 206 may specify that this is not permitted. For example, access controls 206 may specify that secure operations (secure joins and secure functions as discussed below) may be performed with respect to the shared data such that viewing and exporting of the shared data is not permitted.

In some embodiments, once a user is authenticated with respect to a listing 202, a reference to that user (e.g., user identifier of the user's account with the virtual warehouse 131) is added to the access controls 206 such that the user will subsequently be able to access the data referenced by the listing 202 without further authentication.

The listing 202 may define one or more filters 208. For example, the filters 208 may define specific identity data 214 (also referred to herein as user identifiers) of users that may view references to the listing 202 when browsing the catalog 220. The filters 208 may define a class of users (users of a certain profession, users associated with a particular company or organization, users within a particular geographical area or country) that may view references to the listing 202 when browsing the catalog 220. In this manner, a private exchange may be implemented by the exchange manager 124 using the same components. In some embodiments, an excluded user that is excluded from accessing a listing 202 i.e., adding the listing 202 to the consumed shares 156 of the excluded user, may still be permitted to view a representation of the listing when browsing the catalog 220 and may further be permitted to request access to the listing 202 as discussed below. Requests to access a listing by such excluded users and other users may be listed in an interface presented to the provider of the listing 202. The provider of the listing 202 may then view demand for access to the listing and choose to expand the filters 208 to permit access to excluded users or classes of excluded users (e.g., users in excluded geographic regions or countries).

Filters 208 may further define what data may be viewed by a user. In particular, filters 208 may indicate that a user that selects a listing 202 to add to the consumed shares 156 of the user is permitted to access the data referenced by the listing but only a filtered version that only includes data associated with the identifier 214 of that user, associated with that user's organization, or specific to some other classification of the user. In some embodiments, a private exchange is by invitation: users invited by a provider to view listings 202 of a private exchange are enabled by the exchange manager 124 upon communicating acceptance of an invitation received from the provider.

In some embodiments, a listing 202 may be addressed to a single user. Accordingly, a reference to the listing 202 may be added to a set of "pending shares" that is viewable by the user. The listing 202 may then be added to a group of shares of the user upon the user communicating approval to the exchange manager 124.

The listing 202 may further include usage data 210. For example, the cloud computing service 112 may implement a credit system in which credits are purchased by a user and are consumed each time a user runs a query, stores data, or uses other services implemented by the cloud computing service 112. Accordingly, usage data 210 may record an amount of credits consumed by accessing the shared data. Usage data 210 may include other data such as a number of queries, a number of aggregations of each type of a plurality of types performed against the shared data, or other usage statistics. In some embodiments, usage data for a listing 202 or multiple listings 202 of a user is provided to the user in the form of a shared database, i.e. a reference to a database including the usage data is added by the exchange manager 124 to the consumed shares 156 of the user.

The listing 202 may also include a heat map 211, which may represent the geographical locations in which users have clicked on that particular listing. The cloud computing service 112 may use the heat map to make replication decisions or other decisions with the listing. For example, a data exchange may display a listing that contains weather data for Georgia, USA. The heat map 211 may indicate that many users in California are selecting the listing to learn more about the weather in Georgia. In view of this information, the cloud computing service 112 may replicate the listing and make it available in a database whose servers are physically located in the western United States, so that consumers in California may have access to the data. In some embodiments, an entity may store its data on servers located in the western United States. A particular listing may be very popular to consumers. The cloud computing service 112 may replicate that data and store it in servers located in the eastern United States, so that consumers in the Midwest and on the East Coast may also have access to that data.

The listing 202 may also include one or more tags 213. The tags 213 may facilitate simpler sharing of data contained in one or more listings. As an example, a large company may have a human resources (HR) listing containing HR data for its internal employees on a data exchange. The HR data may contain ten types of HR data (e.g., employee number, selected health insurance, current retirement plan, job title, etc.). The HR listing may be accessible to 100 people in the company (e.g., everyone in the HR department). Management of the HR department may wish to add an eleventh type of HR data (e.g., an employee stock option plan). Instead of manually adding this to the HR listing and granting each of the 100 people access to this new data, management may simply apply an HR tag to the new data set and that can be used to categorize the data as HR data, list it along with the HR listing, and grant access to the 100 people to view the new data set.

The listing 202 may also include version metadata 215. Version metadata 215 may provide a way to track how the datasets are changed. This may assist in ensuring that the data that is being viewed by one entity is not changed prematurely. For example, if a company has an original data set and then releases an updated version of that data set, the updates could interfere with another user's processing of that data set, because the update could have different formatting, new columns, and other changes that may be incompatible with the current processing mechanism of the recipient user. To remedy this, the cloud computing service 112 may track version updates using version metadata 215. The cloud computing service 112 may ensure that each data consumer accesses the same version of the data until they accept an updated version that will not interfere with current processing of the data set.

The exchange data 200 may further include user records 212. The user record 212 may include data identifying the user associated with the user record 212, e.g., an identifier (e.g., warehouse identifier) of a user having user data 151 in service database 158 and managed by the virtual warehouse 131.

The user record 212 may list shares associated with the user, e.g., listings 154 (shares 154) created by the user. The user record 212 may list shares consumed by the user i.e., consumed shares 156 which may be listings 202 created by another user and that have been associated to the account of the user according to the methods described herein. For example, a listing 202 may have an identifier that will be used to reference it in the shares or consumed shares 156 of a user record 212.

The listing 202 may also include metadata 204 describing the shared data. The metadata 204 may include some or all of the following information: an identifier of the provider of the shared data, a URL associated with the provider, a name of the share, a name of tables, a category to which the shared data belongs, an update frequency of the shared data, a catalog of the tables, a number of columns and a number of rows in each table, as well as name for the columns. The metadata 204 may also include examples to aid a user in using the data. Such examples may include sample tables that include a sample of rows and columns of an example table, example queries that may be run against the tables, example views of an example table, example visualizations (e.g., graphs, dashboards) based on a table's data. Other information included in the metadata 204 may be metadata for use by business intelligence tools, text description of data contained in the table, keywords associated with the table to facilitate searching, a link (e.g., URL) to documentation related to the shared data, and a refresh interval indicating how frequently the shared data is updated along with the date the data was last updated.

The metadata 204 may further include category information indicating a type of the data/service (e.g., location, weather), industry information indicating who uses the data/service (e.g., retail, life sciences), and use case information that indicates how the data/service is used (e.g., supply chain optimization, or risk analysis). For instance, retail consumers may use weather data for supply chain optimization. A use case may refer to a problem that a consumer is solving (i.e., an objective of the consumer) such as supply chain optimization. A use case may be specific to a particular industry or can apply to multiple industries. Any given data listing (i.e., dataset) can help solve one or more use cases, and hence may be applicable to multiple use cases.

The exchange data 200 may further include a catalog 220. The catalog 220 may include a listing of all available listings 202 and may include an index of data from the metadata 204 to facilitate browsing and searching according to the methods described herein. In some embodiments, listings 202 are stored in the catalog in the form of JavaScript Object Notation (JSON) objects.

Note that where there are multiple instances of the virtual warehouse 131 on different cloud computing platforms, the catalog 220 of one instance of the virtual warehouse 131 may store listings or references to listings from other instances on one or more other cloud computing platforms 110. Accordingly, each listing 202 may be globally unique (e.g., be assigned a globally unique identifier across all of the instances of the virtual warehouse 131). For example, the instances of the virtual warehouses 131 may synchronize their copies of the catalog 220 such that each copy indicates the listings 202 available from all instances of the virtual warehouse 131. In some instances, a provider of a listing 202 may specify that it is to be available on only specified one or more computing platforms 110.

In some embodiments, the catalog 220 is made available on the Internet such that it is searchable by a search engine such as the Bing search engine or the Google search engine. The catalog may be subject to a search engine optimization (SEO) algorithm to promote its visibility. Potential consumers may therefore browse the catalog 220 from any web browser. The exchange manager 124 may expose uniform resource locators (URLs) linked to each listing 202. This URL may be searchable and can be shared outside of any interface implemented by the exchange manager 124. For example, the provider of a listing 202 may publish the URLs for its listings 202 in order to promote usage of its listing 202 and its brand.

Figure 3:
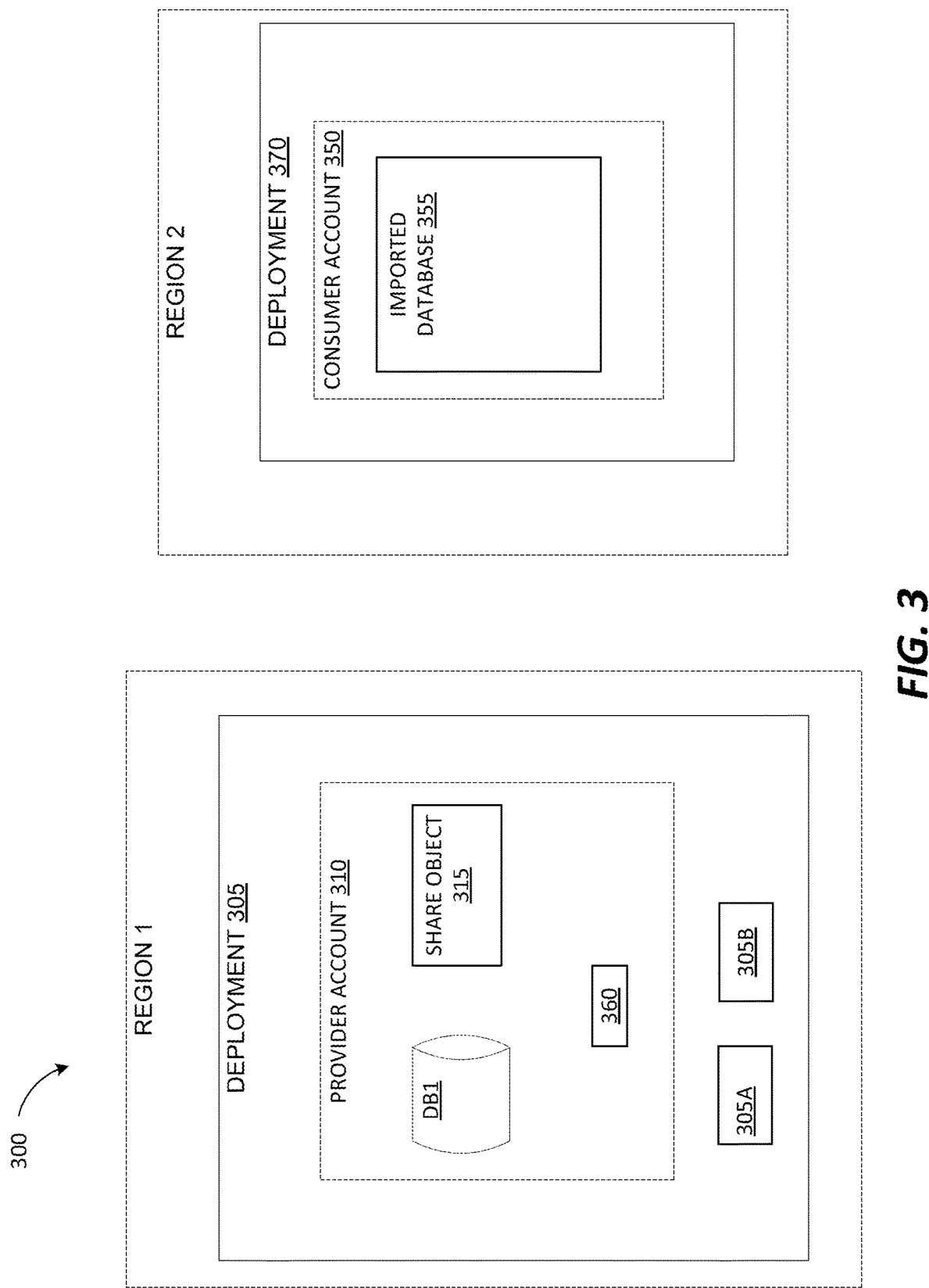
FIG. 3 is a schematic block diagram of deployment of a data exchange that illustrates consumer and provider managed data access techniques, in accordance with some embodiments of the present invention.

FIG. 3 illustrates a cloud environment 300 comprising a cloud deployment 305 and a cloud deployment 370, each of which may comprise a similar architecture to cloud computing service 112 (illustrated in FIG. 1A) and may be a deployment of a data exchange or data marketplace. The cloud deployment 305 may be located in a first geographic region (region 1) while the cloud deployment 370 may be located in a second geographic region (region 2). Although illustrated with two cloud deployments, the cloud environment 300 may have any appropriate number of cloud deployments which may be physically located in separate remote geographical regions but may all be deployments of a single data exchange or data marketplace. In addition, in code, a deployment may include a region group and a data exchange/data marketplace region, for example PUBLIC.AWS_US_EAST_1 (region group), CAPONE.AWS_US_WEST_1 (data exchange/data marketplace region). Sharded deployments are deployments that share the same region group and data exchange region. Thus, a single deployment location could have multiple sharded deployments, for example PUBLIC.AWS_US_EAST_1 may have three sharded deployments (va, va2 and va3). Although embodiments of the present disclosure are described with respect to a data exchange, this is for example purposes only and the embodiments of the present disclosure may be implemented in any appropriate enterprise database system or data sharing platform where data may be shared among users of the system/platform.

The cloud deployment 305 may include hardware such as processing device 305A (e.g., processors, central processing units (CPUs), memory 305B (e.g., random access memory (RAM), storage devices (e.g., hard-disk drive (HDD), solid-state drive (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The cloud deployment 305 may comprise any suitable type of computing device or machine that has a programmable processor including, for example, server computers, desktop computers, laptop computers, tablet computers, smartphones, set-top boxes, etc. In some examples, the cloud deployment 305 may comprise a single machine or may include multiple interconnected machines (e.g., multiple servers configured in a cluster).

Databases and schemas may be used to organize data stored in the cloud deployment 305 and each database may belong to a single account within the cloud deployment 305. Each database may be thought of as a container having a classic folder hierarchy within it. Each database may be a logical grouping of schemas and a schema may be a logical grouping of database objects (tables, views, etc.). Each schema may belong to a single database. Together, a database and a schema may comprise a namespace. When performing any operations on objects within a database, the namespace is inferred from the current database and the schema that is in use for the session. If a database and schema are not in use for the session, the namespace must be explicitly specified when performing any operations on the objects. As shown in FIG. 3, the cloud deployment 305 may include a provider account 310 including database DB1, which may have any appropriate number of schemas (not shown).

FIG. 3 also illustrates share-based access to objects in the provider account 310. The provider account 310 may create a share object 315, which includes grants to database DB1. The share grants on share object 315 may be stored in the form of grant metadata. The cloud deployment 305 may utilize any appropriate metadata store such as FoundationDB, for example, to store the grant metadata of share object 315 as well as share metadata of share object 315 and database metadata of DB1. If the provider account 310 wants to replicate share object 315 to the consumer account 350 (which resides in cloud deployment 370 located in region 2), the provider account 310 may alter share object 315 to be a global object and replicate share object 315 to the remote deployment 370. More specifically, cloud deployment 305 may modify share object 315, which is an object specific to region 1, to include a global representation that is present in region 2. A global object may have e.g., an "authorization properties" field to store a list of global accounts that are enabled to create a local replica of the global object. In addition, a global object may include an e.g., "primary on" field which may be used to distinguish the primary global object from secondary replicas. Cloud deployment 305 may set the authorization properties of share object 315 to store a list of global accounts that are enabled to create a local replica of share object 315 and include in the list of the consumer account 350. In some embodiments, the "primary on" field of the share object 315 may be set to the timestamp value of when the provider account 310 alters share object 315 to be a global object and replicates share object 315 to the cloud deployment 370. In this way, cloud deployment 305 may identify share object 315 as a primary and distinguish it from any secondary replicas.

After the share object 315 is created, it may be imported or referenced by consumer account 350 (which has been listed in the share object 315). More specifically, the cloud deployment 305 may retrieve all the share grants for share object 315, serialize all the share grants, and put the serialized share grants into a file and transmit a message including the file to the cloud deployment 370. In some embodiments, the cloud deployment 305 may leverage a global messaging framework and utilize a special message type (referred to herein as a "snapshot message") that specifically enables the share replication. For each global message type, there is a corresponding processing function that applies to processing messages of that type. Thus, a global message of a particular type will include custom logic for what processing needs to be done for that particular message type. The snapshot message type may include information to inform a deployment that the message includes grants and allow a remote deployment (i.e., deployment 370) to properly deserialize the grants for the purposes of share replication. More specifically, the body of the message may comprise a global object reference for share object 315 and a list of modified grant objects representing the grants on DB1 and its underlying objects to share object 315. The global object reference may comprise a tuple of the original deployment ID (e.g., the ID of cloud deployment 305) and the ID of the object to be replicated, which in this example is the ID of the share object 315. Each grant object may be an internal representation of a particular grant to share object 315 and may be associated to share object 315 to allow a consumer to use/select the underlying database objects defined by the grant. Each grant object may have several fields including: a global object reference of DB1 or one of its underlying objects that are granted to the share object 315, an object type (e.g., securable type), a privilege/grant type (e.g., usage or select), and a timestamp of when the grant happened, for example.

Consumer account 350 may run a command to list all available share objects for importing. Only if the share object 315 was created with a reference to the consumer account 350, then the consumer account 350 reveals the share object using the command to list all share objects and subsequently import it. In one embodiment, references to a share object in another account are always qualified by account name.

FIG. 3 also illustrates a database role 360. A database role may function similarly to an account level role, except for the fact that the database role may be defined inside a database (e.g., DB1 in the example of FIG. 3) or any appropriate database container (e.g., a schema). The database role 360 may be an object that is of a different type than an account level role or any other object (e.g., may be a new object type) and may be referenced using a qualifier based on the name of the database it is created within (e.g., DB1.ROLE1). Although the database role 360 may be similar to an account level role with respect to grants of privileges that can be assigned, the database role 360 may exist exclusively within database DB1 (the database in which it was defined). Thus, privileges granted to the database role 360 must be limited in scope to the objects contained in the database DB1 where the database role 360 is defined. The database role 360 may allow for the privileges provided by the share object 355 to be modularized to provide access to only certain objects of the database DB1 that the share object 355 has grants to.

When a database is replicated, a corresponding account level role could be replicated, or the database itself could be designated as the unit of replication. By defining the database role 360 within database DB1, a clear separation between the database role 360 and the other units of replication (e.g., account level roles) may be realized. Because privileges to a subset of the objects within database DB1 (and no other database) are granted to the database role 360, the database role 360 and the subset of the objects to which it has been granted privileges (e.g., modularized privileges) are all maintained in the database DB1. In addition, the executing role of provider account 310 must have a usage privilege on the database DB1 where the database role 360 is defined in order to resolve it.

In this way, if the provider account 310 grants to a consumer account access to a share object which has been granted privileges to the database DB1, then the consumer account may see all the contents of DB1. However, by utilizing multiple database roles that are each granted privileges to particular objects (e.g., subsets of the objects) within the database DB1, the consumer account may only see/access objects for which privileges have been granted to the database roles the consumer account has been granted access to. A database role can be granted to account level roles, or other database roles that are within the same database. A database role cannot be granted to another database role from a different database.

In some embodiments, any objects granted by a provider account to a share object will not result in objects being automatically created in the consumer account. In this way, lifecycle problems can be avoided. For example, if a shared database role is renamed, there is no need for all existing automatically created objects to be renamed as well. In another example, if a database role is dropped, there is no need for all existing automatically created objects to be dropped as well. In a further example, if a new database role is added to the share object in the provider account, objects to which the new database role has been granted privileges will not automatically be created in all existing shared databases in consumer accounts.

Similar to the way that data can be shared from a provider account to a consumer account, applications can also be shared from a provider account to a consumer account. As with sharing of data, sharing of a native application (hereinafter referred to as an application) may be performed using a shared container. A provider may define an application share object (same as a standard share object) and may couple a database comprising an installation script for installing the application to the application share object. In some embodiments, the installation script may be in the form of a stored procedure. Stored procedures may be similar to functions in the sense that they are both evaluated as expressions. Unlike functions however, stored procedures are used via CALL statements and do not appear in other statement types the way functions do (e.g., in a SELECT or WHERE part of a query). A primary feature of stored procedures is their ability to execute other queries and access their results. As with functions, a stored procedure may be created once and then can be executed many times. Indeed, a stored procedure implemented with e.g., Javascript can be thought of as a Javascript UDF augmented with the ability to issue other queries during execution of the Javascript body. When a consumer imports the database that is coupled to the application share object locally, it will trigger execution of the installation script which will build out all of the objects and procedures required for the application to run as discussed in further detail herein.

Figure 4A:
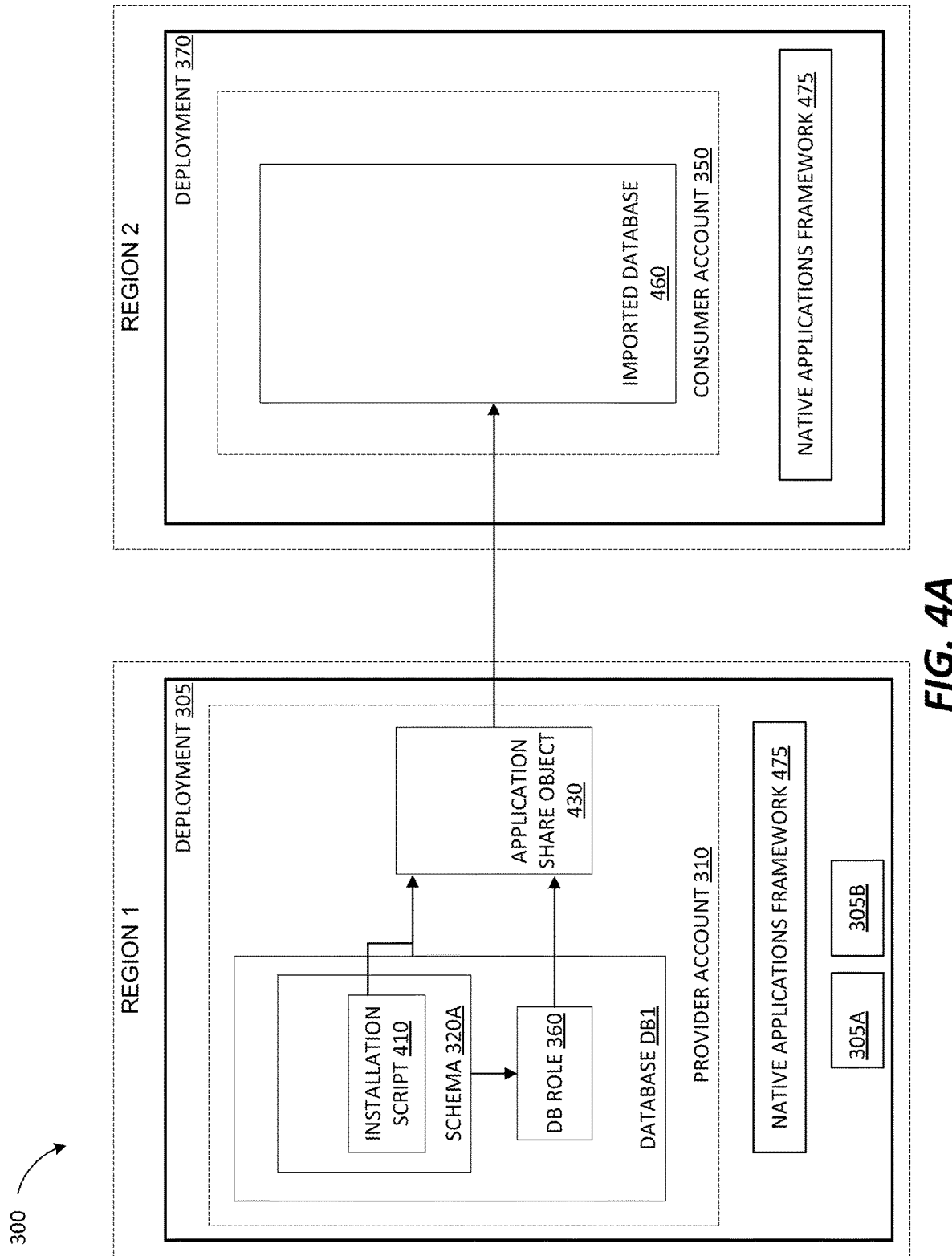
FIGS. 4A and 4B are block diagrams of a deployment of a data exchange, illustrating application sharing techniques, in accordance with some embodiments of the present invention.

FIG. 4A illustrates an example native application sharing process taking place within the cloud environment 300. Upon creating the database DB1 and the schema 320A, the provider account 310 may generate an installation script 410 and store it in the schema 320A as a stored procedure. The native applications framework 475 may enable the provider account 310 to indicate that a particular stored procedure is an installation script that will automatically be invoked with no arguments when a consumer with whom the stored procedure has been shared requests installation of the application.

The provider account 310 may define the installation script 410 with the necessary functionality to install the application (including any objects and procedures required by the application) in the consumer account 350. The provider account 310 may create an application share object 430 in the same manner that a normal share object is created and attach the installation script 410 to the application share object 430. The provider account 310 may then grant the necessary privileges to the application share object 430 including usage on the database DB1, usage on the schema 320A, and usage on the installation script 410.

When the consumer account 350 runs a command to see the available shares, they may see the application share object 430 and may import the application share object 430 to create an imported database 460 from the application share object 430. In response to the creation of the imported database 460, the native applications framework 475 may automatically trigger execution of the installation script 410, which may create objects as well as tasks/procedures corresponding to the application functionality in the consumer account 350. For example, the installation script 410 may create a procedure that periodically contacts a third-party API and retrieves data from the third-party API to the imported database 460 for processing. As the application must access data and perform various functions, the imported database 460 is no longer a read-only database as it will not only include the application share object 430 from the provider account 310 (read only) but also have objects locally created inside the imported database via the stored procedures/installation script 410 that come with the application.

The consumer account 350 may create the necessary objects that will be used by the application such as credentials, API integration, and a warehouse. The consumer account 350 may also grant privileges necessary for the application to run (some privileges are granted on objects managed and owned by the consumer account 350) including usage on secrets, usage on the API Integration, usage on the warehouse, and privileges granted to the application if it needs to access objects of the consumer account 350 or execute procedures in the consumer account 350. Once installed, the application may perform various functions in the consumer account 350 as long as the consumer account 350 has authorized it. The application can act as an agent and take any action that any role on the consumer account 350 could take such as e.g., set up a task pipeline, set up data ingestion (e.g., via Snowpipe™ ingestion), or any other defined functionality of the application. The application may act on behalf of the consumer account 350 and execute procedures in a programmatic way.

As can be seen, the native applications framework 475 may enable users of a data marketplace to build native applications that can be shared with other users of the data marketplace. The native applications can be published and discovered in the data marketplace like any other data listing, and consumers can install them in their local data marketplace account to serve their data processing needs. This helps to bring data processing services and capabilities to consumers instead of requiring a consumer to share data with e.g., a service provider who can perform these data processing services and share the processed data back to the consumer. Stated differently, instead of a consumer having to share potentially sensitive data with a third party who can perform the necessary data processing services and send the results back to the consumer, the desired data processing functionality may be encapsulated, and then shared with the consumer so that the consumer does not have to share their potentially sensitive data.

Figure 4B:
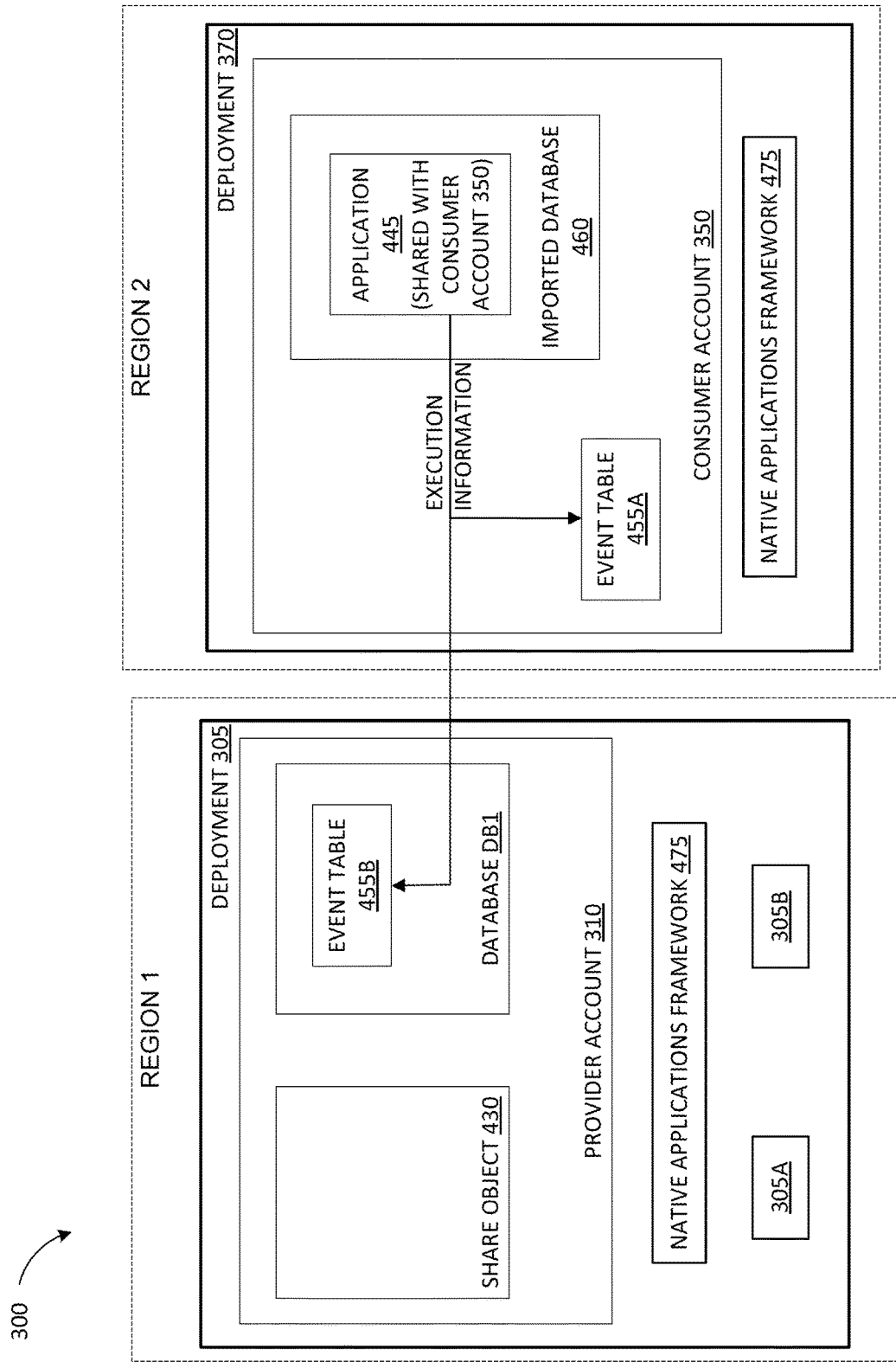

As discussed hereinabove, execution information generated by native applications has a variety of uses for both providers and consumers. The native applications framework 475 may provide functionality to log execution information of native applications being executed by a consumer and provide such execution information to the consumer. FIG. 4B illustrates the deployment 370 with the consumer account 350 executing application 445, which is an application the provider account 310 has shared with the consumer account 350 as discussed above with respect to FIG. 4A. The native applications framework 475 may monitor execution of the application 445 to obtain execution information including execution logs, trace events, and usage metrics, and provide this execution information to the consumer account 350 and the provider account 310. More specifically, the native applications framework 475 may facilitate the ingestion and storage of execution information into an event table 455A of the consumer account 350 and an event table 455B of the provider account 310 whenever the consumer account 350 calls the application 445. Each account (consumer or provider) of the deployment 305 may include an event table (e.g., event table 455A of the consumer account and event table 455B of the provider account) which may be used to store execution information generated by applications they are sharing or consuming. The native applications framework 475 may include a logger utility (not shown) that may configure the targets (e.g., consumer event table 455A and provider event table 455B) into which execution information associated with execution of the application 445 is to be loaded.

However, logging events in this way can result in significant data transfer costs when the provider account and the consumer account reside in different regions as in the example of FIG. 4B (i.e., event sharing has to be performed cross-region). In addition, logging execution information (shared events) as described above can implicate data sovereignty requirements from both the provider and the consumer. For example, if providers and/or consumers have very strict data residency requirements, they cannot enable the event sharing feature if they are in different regions. In addition, if a provider has multiple listing accounts, the shared events from consumers in different regions will be spread across those listing accounts and the provider must figure out which of their listing accounts to login to when investigating a particular consumer's issues. This problem is compounded if a consumer uses applications from different listings at the same time, because the provider must switch between different listing accounts.

Embodiments of the present disclosure provide a region-specific events account that is used as a central place to store the events shared by consumers in that region. This helps reduce the operational burden of the provider as they don't need to figure out which accounts have shared events for each different consumer. The provider only needs to login to the events account which is in the same region as the consumer and can query all shared events from different applications that are being used in that region. Also, since the provider can designate an events account in each region, the shared events could be directly ingested into the events account without traveling to a different region.

Each region may have a maximum of one events account, and an administrator account of an organization may have the responsibility of designating an account in each region as the organization's events account for that region. If there is already an events account when the administrator account designates an account as an events account, the newly designated account may become the new events account, with the previous events account being un-designated as the events account as discussed in further detail herein. When a new account is designated as the events account, the native applications framework 475 may minimize the time window of the events account "swap" to reduce the interruption of event sharing as discussed in further detail herein. The administrator account of an organization can query a list of events accounts within the organization to determine which account is their events account for each region. In some embodiments, if there is no events account in a region, an application consumer cannot enable event sharing for the application.

Figure 5A:
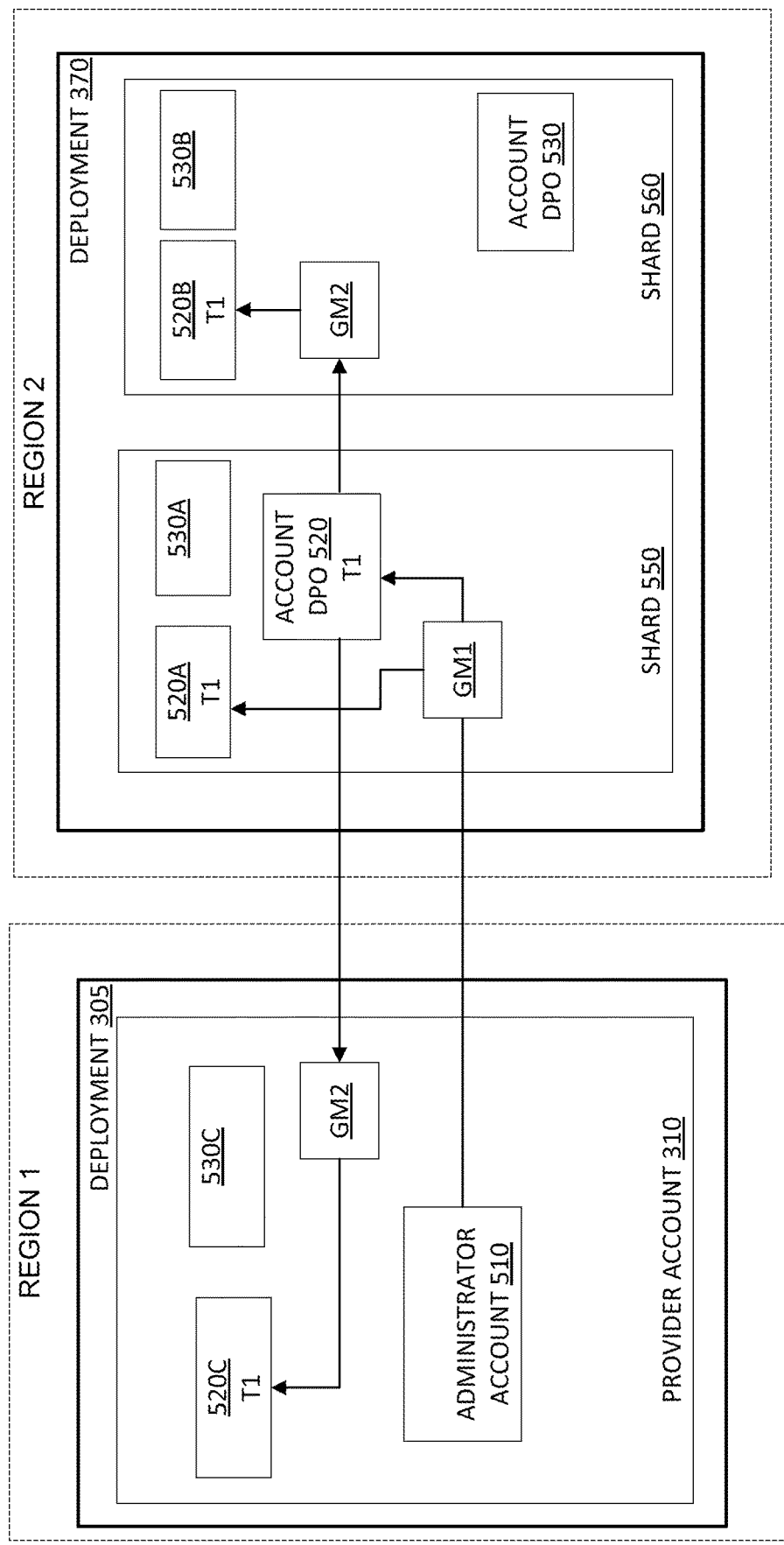
FIGS. 5A-5D are block diagrams of deployments of a data exchange implementing a region-specific events account that is used as a central place to store the events shared by consumers in that region, in accordance with some embodiments of the present invention.

FIGS. 5A-5D illustrate the process of using a region-specific events account to ingest execution information generated from execution of one or more applications by consumers in that region. It should be noted that the techniques described herein may be performed by events account designation logic (not shown) which may be part of the native applications framework 475 as well as the replication framework of the deployment 370 (also not shown). In some embodiments, the events account designation logic may be standalone logic that can be executed by each deployment to perform the techniques described herein. FIG. 5A illustrates the deployment 305 with an administrator account 510 as well as replicas of accounts 520 and 530, which may all be accounts within the provider's organization. The accounts 520 and 530 may each comprise a global account object as discussed in further detail hereinabove. The deployment 370 may include a first shard 550 and a second shard 560. The account 520 may also reside in the shard 550, while the account 530 may also reside in the shard 560. More specifically, the shard 550 may include the account 520, which may be shown in the FIGS. and referred to herein as an account DPO 520 global object. The shard 550 may also include a replica (i.e., a global representation) of the account DPO 520 global object which is referred to herein and in the FIGS. as 520A. In addition, region 1 may include a global representation 520C.

The shard 560 may include the account 530, which may be shown in the FIGS. and referred to herein as an account DPO 530 global object. The shard 560 may also include a replica (i.e., a global representation) of the account DPO 530 global object which is referred to herein and in the FIGS. as 530B. The replica 530B may be considered an extension of the account DPO 530 global object. The shard 550 may also include a replica of the account DPO 530 global object which is referred to herein and in the FIGS. as global representation 530A and region 1 may include a replica of the account DPO 530 global object 530C. The global representations 530A-C may be considered extensions of the account 530 global object as discussed herein. The shard 560 may also include a replica (global representation) of the account DPO 520 global object which is referred to herein and in the FIGS. as 520B. The global representations 520A-C may be considered extensions of the account DPO 520 global object. The account DPO 520 global object and the account DPO 530 global object may each be set (as discussed hereinabove) to be the primary while each of their replicas (global representations) may be set as secondaries.

Each account DPO may comprise a data structure that includes information (i.e., metadata) about the corresponding account such as databases, users, roles, and warehouses. Each account DPO global object 520 and 530 may also include a field (called e.g., "EventsAccountSetOn") to store a timestamp indicating the current time when the corresponding account has been set as an event account. Each global representation may also include such a field (e.g., "EventsAccountSetOn") to store the timestamp indicating the current time when the corresponding account has been set as an event account. If the "EventsAccountSetOn" field of an account DPO global object is "0," this indicates that the corresponding account has not been set as an events account. However, if the "EventsAccountSetOn" field of an account DPO global object is larger than 0, this does not necessarily mean that the corresponding account is an event account as discussed in further detail herein. Although illustrated as a timestamp, any appropriate means of indicating an account as an events account (e.g., a global monotonically increasing counter) may be utilized.

When the provider wishes to designate the account 520 as the event account for region 2, the provider (via the administrator account 510) may invoke a command to designate an account as an events account and specify account 520 as the account to be designated. As part of the command, the administrator account 510 may transmit a message (shown as GM1 in FIG. 5A) from region 1 to shard 550 in region 2 (where the account 520 resides). The message GM1 may be a global message (as discussed hereinabove) having logic to set the "EventsAccountSetOn" field of the account DPO 520 global object to timestamp T1, corresponding to the current time (and thus setting account 520 as the event account for region 2). The logic of message GM1 may also immediately update the "EventsAccountSetOn" field of global representation 520A with the timestamp T1 to indicate that the account 520 has been designated the events account for region 2.

The replication framework (not shown) of deployment 370 may subsequently transmit another global message (shown as GM2 in FIG. 5A) to region 1 and shard 560 in region 2. The message GM2 may include logic to propagate the change of account 520 to an event account globally. The message GM2 may update the "EventsAccountSetOn" fields of the global representation 520C in region 1 and the global representation 520B in shard 560 of region 2 with the timestamp T1 to indicate that the account 520 has been designated the events account for region 2. Once message GM2 is received and processed in region 1 and region 2, the account DPO 520 global object is up to date.

It should be noted that GM1 may be referred to as a blocking operation such that the command to designate an account as an events account will wait until message GM1 is processed successfully before allowing any other operations to proceed. If the message GM1 fails or times out, the administrator account 510 can call the command to designate account 520 as an events account again until it is successful. However, because message GM2 is sent and handled by the replication framework of deployment 370 (and not the administrator account 510), it is not a blocking operation and thus there is a time window until the transmission and processing of message GM2 is complete during which the global representation 520B in shard 560 does not yet reflect the change to account 520.

Figure 5B:
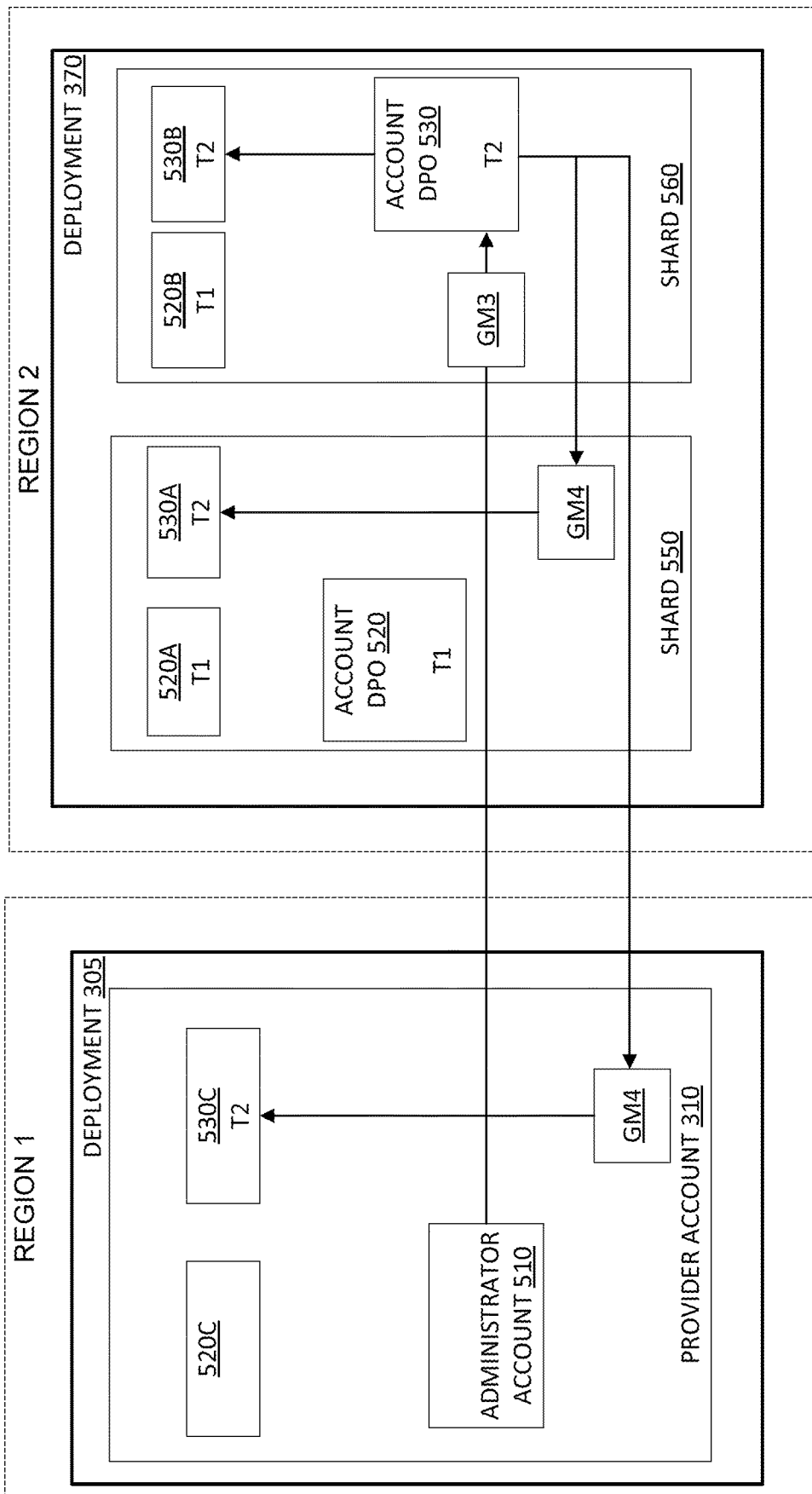

Referring to FIG. 5B, the provider may now wish to designate account 530 as the event account for region 2 and may invoke the command to designate an account as an events account again, specifying account 530 this time. The provider (via the administrator account 510) may transmit message GM3 from region 1 to shard 560 in region 2 (where the account 530 resides). Like message GM1, the message GM3 may be a global message type having logic to set the "EventsAccountSetOn" field of the account DPO 530 global object to timestamp T2, corresponding to the current time (and thus setting account 530 as the event account for region 2). The logic of message GM3 may also immediately update the "EventsAccountSetOn" field of the global representation 530B with the timestamp T2 to indicate that the account 530 has been designated as the events account for region 2. The replication framework of deployment 370 may subsequently transmit another global message (shown as GM4 in the FIG. 5B) to region 1 and deployment shard 550 in region 2. The message GM4 may include logic to propagate the change of account 530 to an event account globally. The message GM4 may update the "EventsAccountSetOn" fields of the global representation 530C in region 1 and the global representation 530A in shard 550 of region 2 with the timestamp T2 to indicate that the account 530 is the event account for region 2. Once message GM4 is received and processed in region 1 and region 2, the account DPO 530 global object is up to date.

As with message GM1, message GM3 may be a blocking operation such that the command to designate an account as an events account will wait until message GM3 is processed successfully before allowing any other operations to proceed. If the message GM3 fails or times out, the administrator account 510 can call the command to designate account 530 as an events account again until it is successful. However, because message GM4 is sent and handled by the replication framework of deployment 370 separately, it is not a blocking operation and thus there is a time window until the transmission and processing of message GM4 is complete during which the global representation 530A in shard 550 has not yet reflected the change to account 530. During this time window, if a workload in shard 550 attempts to resolve the event account before the global representation 530A is updated, the account 520 is returned as the event account (because the global representation 530A does not have a timestamp). After message GM4 has been processed and the global representation 530A is updated, if a workload in shard 550 attempts to resolve the events account, the deployment 370 may compare the time stamps T1 and T2 from global representation 520A and global representation 530A respectively and return account 530 as the event account as the global representation 530A's timestamp is later in time (i.e., T2 is later in time than T1).

It should be noted that the deployment 370 does not reset the "EventsAccountSetOn" field in the account DPO 520 global object until after the message GM4 has been processed as this helps to avoid the interruption of event sharing during the replication of global objects. As discussed herein, to update one or more global representations when an associated account DPO global object is updated, a global message is sent to remote deployments to inform them of the change to the associated account DPO, which is handled asynchronously. If the global representation resides in the same deployment as the updated account DPO global object, then it will be updated by the same message that updated the account DPO global object, and does not require a separate global message to be updated. As a result, regardless of whether the timestamp for account 520 is reset before or after setting the timestamp for account 530, there is no way to guarantee message GM4 will arrive or be processed before account 520's timestamp is reset. Thus, by resetting the "EventsAccountSetOn" field in the account DPO 520 global object before the message GM4 has been processed, there could be a time window during which the system may be unable to find an event account until message GM4 is processed which is undesirable.

When the provider wishes to remove an account's designation as the event account for a region, it may issue a command to each deployment of that region to remove the current events account's designation as the event account. In response, each deployment of that region may scan every global representation (global account object replica) therein and identify (based on the "EventsAccountSetOn" field for each global representation) all accounts that have a timestamp that is less recent than the timestamp of the current events account for the region. Each deployment of the region may group all the accounts identified in this way, and the administrator account 510 may transmit a global message to each deployment to reset the "EventsAccountSetOn" field of those accounts.

Figure 5C:
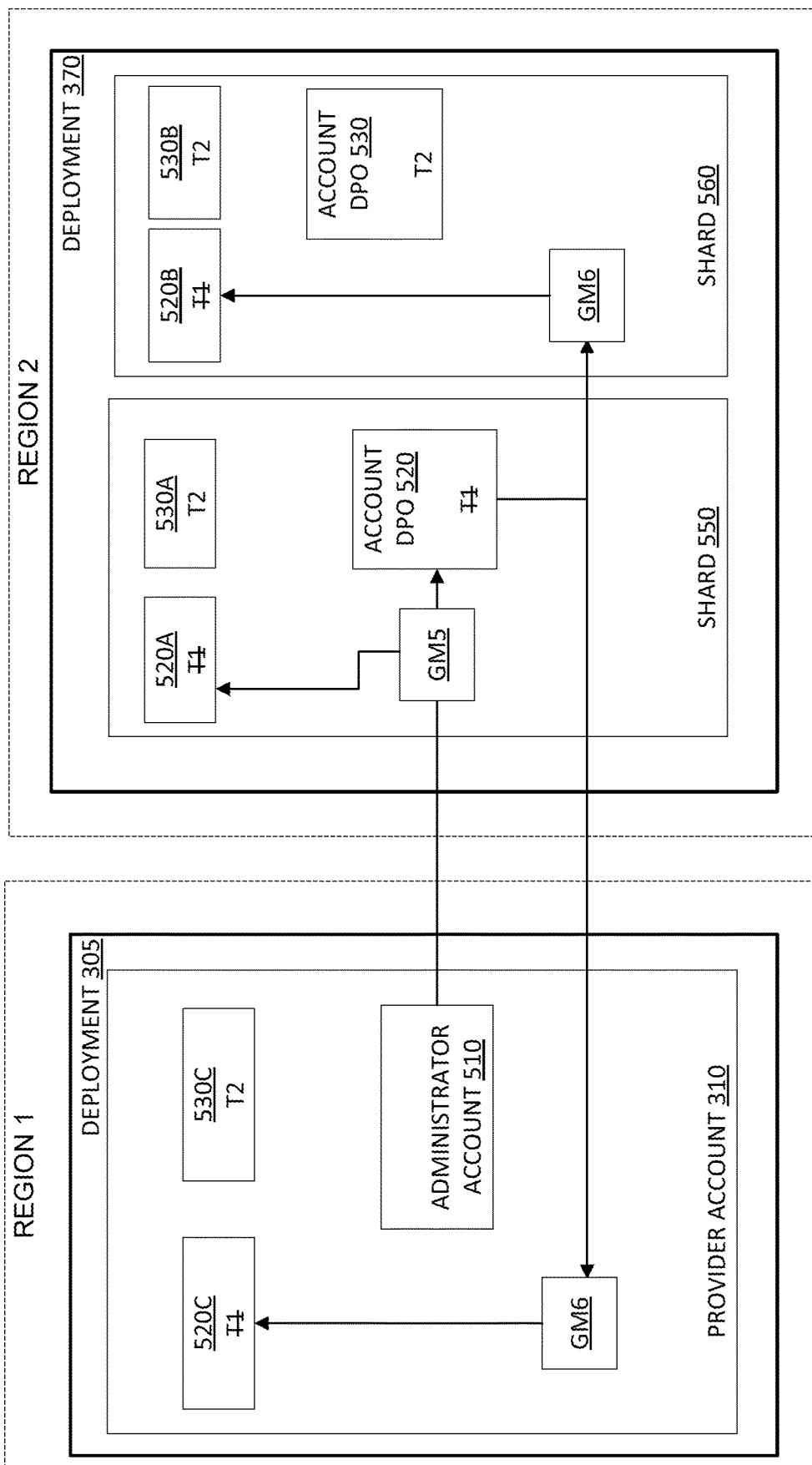

Referring to FIG. 5C, at a third time (T3), the provider may call a command to remove account 530's designation as the event account for region 2. In response to the command to remove account 530's designation as the event account for region 2, the deployment 370 may scan each global representation and (based on the "EventsAccountSetOn" field for each global representation) identify all accounts that have a timestamp that is less recent than the timestamp of the current event account (in this case, T2 for account 530). The deployment 370 may then group these accounts. In the example of FIG. 5C, only the account 520 has a timestamp (T1) that is less recent than the timestamp of account 530 (T2). Thus, the provider (via the administrator account 510) may issue a message GM5 (which may be a global message type) from region 1 to shard 550 in region 2 where account 520 resides. The logic of the message GM5 may reset the "EventsAccountSetOn" fields of the account DPO 520 global object and the global representation 520A to 0.

Figure 5D:
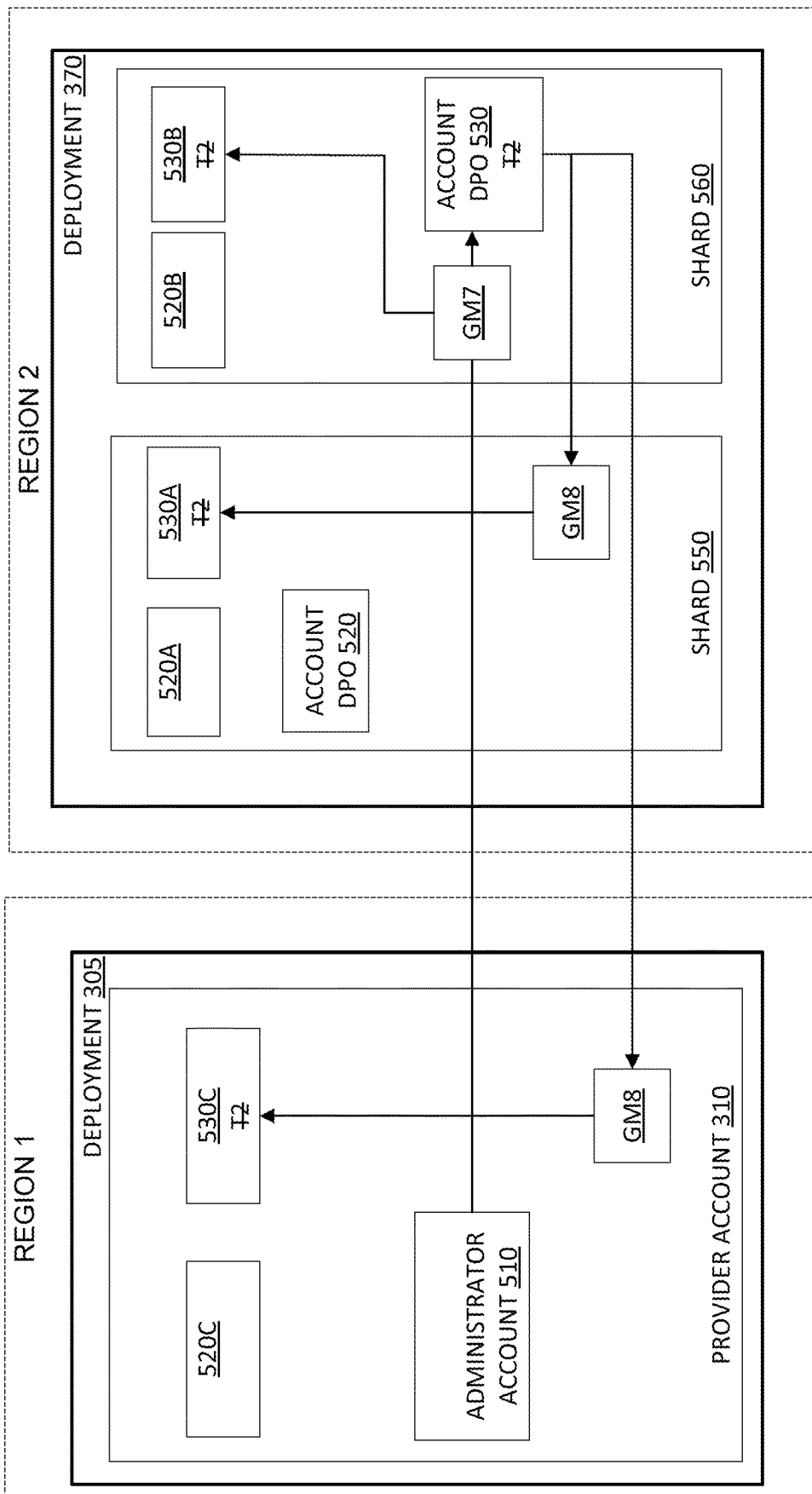

The replication framework of deployment 370 may send a subsequent message GM6 (shown as GM6 in FIG. 5C) having a global message type to region 1 and shard 560 in region 2. The logic of message GM6 may propagate the change of account 520 globally. After message GM6 is processed in region 1 and region 2, the account DPO 520 global object may be up to date. Referring to FIG. 5D, once message GM5 successfully completes, the provider (via administrator account 510) may transmit a message GM7 having a global message type from region 1 to shard 560 in region 2 where the account 530 resides. The logic of the message GM7 may reset the "EventsAccountSetOn" fields of the account DPO 530 global object corresponding to account 530 and the global representation 530B to 0. The replication framework of deployment 370 may send a subsequent message GM8 having a global message type to region 1 and shard 550 in region 2. The logic of message GM8 may propagate the change of account 530 globally by resetting the "EventsAccountSetOn" fields of the global representation 530C and the global representation 530A to 0. After message GM8 is processed in region 1 and region 2, the account DPO 530 global object may be up to date.

It should be noted that message GM5 and message GM7 are both blocking operations, and thus if they fail or timeout, the administrator account 510 can call the command to un-designate account 530 again and again until it is successful. In addition, message GM7 (which resets the status of account 530) must be sent after message GM5 has been successfully processed, otherwise it is possible that workloads in shard 550 will resolve account 520 as the events account for region 2, which is not undesirable.

Because message GM6 and message GM8 are handled separately by the replication framework of deployment 370, there is a time window during which workloads will see the account 530 as the events account in shard 550 and account 520 as the events account in shard 560. However, because the "EventsAccountSetOn" field in the respective account DPO global objects of accounts 520 and 530 has been reset, the deployment 370 can avoid mistakenly forwarding any events/execution information by checking the "EventsAccountSetOn" field of each account DPO global object during the resolution of the event table stage of the account. If the deployment 370 determines there is a zero value in the "EventsAccountSetOn" field, it can stop right before copying events files from the consumer stage to the provider stage.

Although illustrated in FIGS. 5A-5D with deployment 370 divided into shards, this is for example purposes only and the embodiments of the present disclosure can be used to share execution information/shared events from one region to another regardless of whether any deployments involved are divided into shards.

Figure 6:
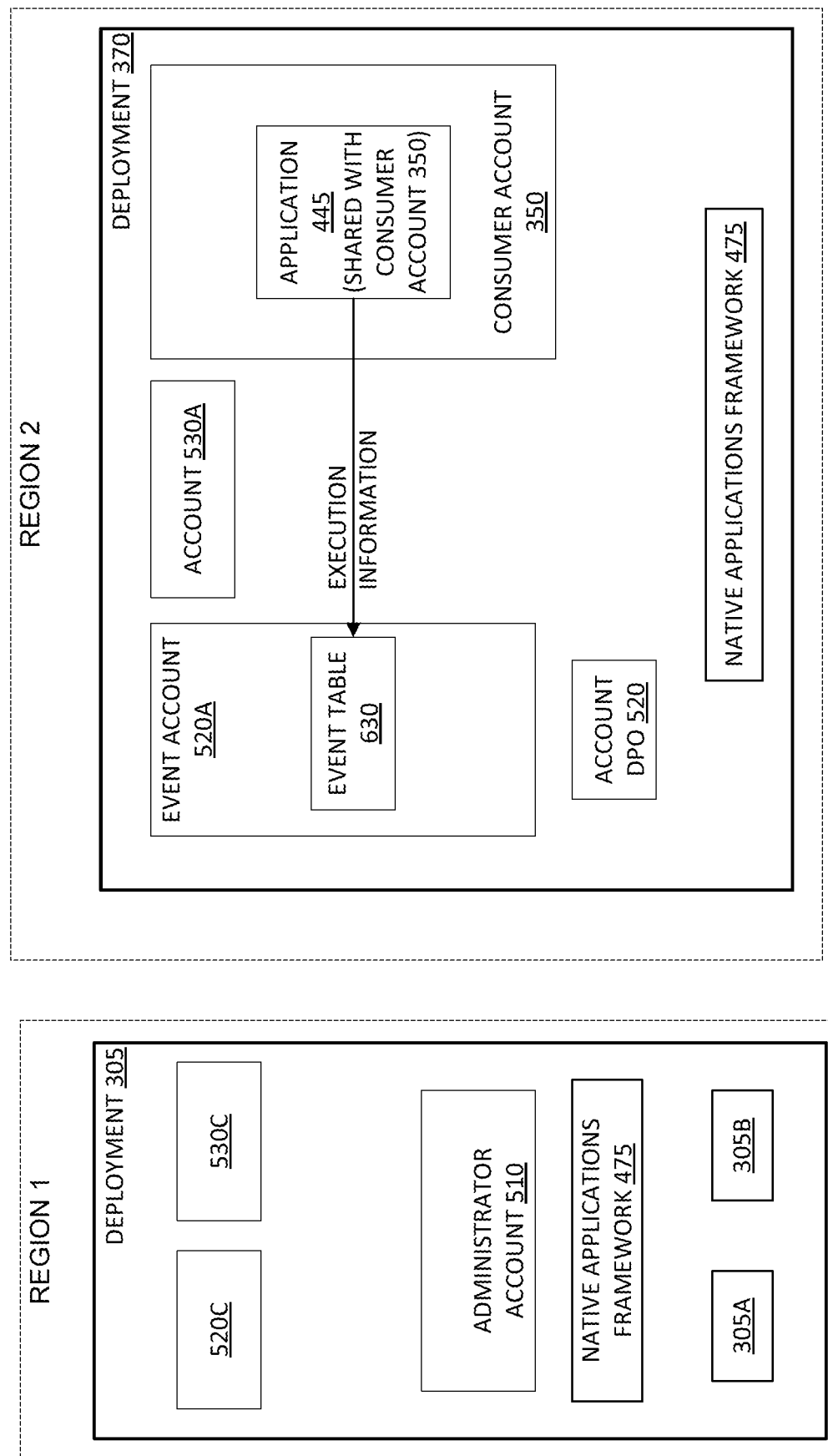
FIG. 6 is a block diagram of deployments of a data exchange where a provider is accessing execution information from a designated events account, in accordance with some embodiments of the present invention.

As discussed herein, each account (whether provider or consumer) of the deployment 305 may include an event table which may be used to store execution information generated by applications they are sharing or consuming. Referring to FIG. 6, once the provider has designated an account (e.g., account 520) as the event account for region 2 as discussed hereinabove, whenever the consumer account 350 (or any consumer account in region 2) calls the application 445, the native applications framework 475 may facilitate the ingestion and storage of execution information into an event table 630 of the event account 520. The event table 630 may be located on the global representation 520A located in region 2.

Once an events account for a region has been set, the provider may wish to query the events account to obtain events/execution information. When the provider wishes to query (via the administrator account 510) the events account of a region, the administrator account 510 may scan through each global account object in the same region as the query command being invoked that belong to the provider and return those accounts whose global account object has a timestamp set. If there are more than one accounts from the same region with a timestamp set, the administrator account 510 may select the account with the most recent timestamp. Note that because global messages are not used to collect execution information from the events account of a particular region, it is possible that the particular region will not see the latest events accounts of remote regions. However, the global account objects will eventually get updated once all global messages are delivered and processed.

In the Example of FIG. 5A, the message GM2 is sent by the replication framework and is handled asynchronously. As a result, the deployment 370 cannot guarantee when the message GM2 will arrive at region 1 and update the global representation 520C. Thus, during that time window, if the administrator account 510 queries the events account for region 2, it will read the stale state of account 520. However, for the native application 445 running in shard 550, the consumer account 350 can resolve account 520 as the events account because the account DPO 520 global object has been updated. When the message GM2 eventually arrives at region 1 and is processed, then both the administrator account 510 in region 1 and the native application 445 in shard 550 will have a consistent view of the events account.

The native applications framework 475 may also provide account management operations which can be performed on the events account 520 as well as other accounts. One such operation may be a lock/suspend operation, where if an account 530 has been locked or suspended, the administrator account of the organization cannot designate it as the events account. In addition, if the events account 520 has been locked/suspended, the execution information/shared events resulting from execution of application 445 will not be delivered into the locked/suspended events account 520 (i.e., will not be delivered into the event table 630 of the global representation 520A of the locked/suspended events account 520). The native applications framework 475 may also provide an operation to drop an events account. However, because the native applications framework 475 performs a "lazy" timestamp reset for previous events accounts while disabling a current events account, it is possible that a user would mistakenly resolve the previous events account as the current events account if the current events account is dropped without disabling it first. To minimize the chance of this happening, in some embodiments the native applications framework 475 may assign a task after designating a new events account that will reset the timestamp of previous events accounts in the asynchronous task queue and periodically run a housekeeping background service (i.e., a periodical task that runs in the background) to execute the tasks. The background task is one task per shard and may identify the events account of one region, and then scan through all account DPO global objects in the shard and reset the "eventsAccountSetOn" field to 0 if the account DPO global object is not the events account. The native applications framework 475 may also provide an operation to move an events account into another organization. Similar to the "drop account" operation, it is possible that a user would mistakenly resolve the previous events account as the active events account if the current events account is moved without disabling it first. Thus, the native applications framework 475 may take a similar approach and can assign a task after designating a new events account that will reset the timestamp of previous events accounts in the asynchronous task queue and periodically run a housekeeping BG service to execute the tasks.

It should be noted that with both of the above approaches, there is a chance that the provider is not aware the events account is gone (either being dropped or moved to another organization) and may be surprised to find out there are no shared events later. Thus, in some embodiments, the native applications framework 475 may block a drop operation that would drop an account that has been designated as an events account. This would assist in preventing an events account from being dropped by mistake. Similarly, the native applications framework 475 may block a move operation that would move an account that has been designated as an events account to another organization. This would assist in preventing an events account from being migrated by mistake.

Figure 7:
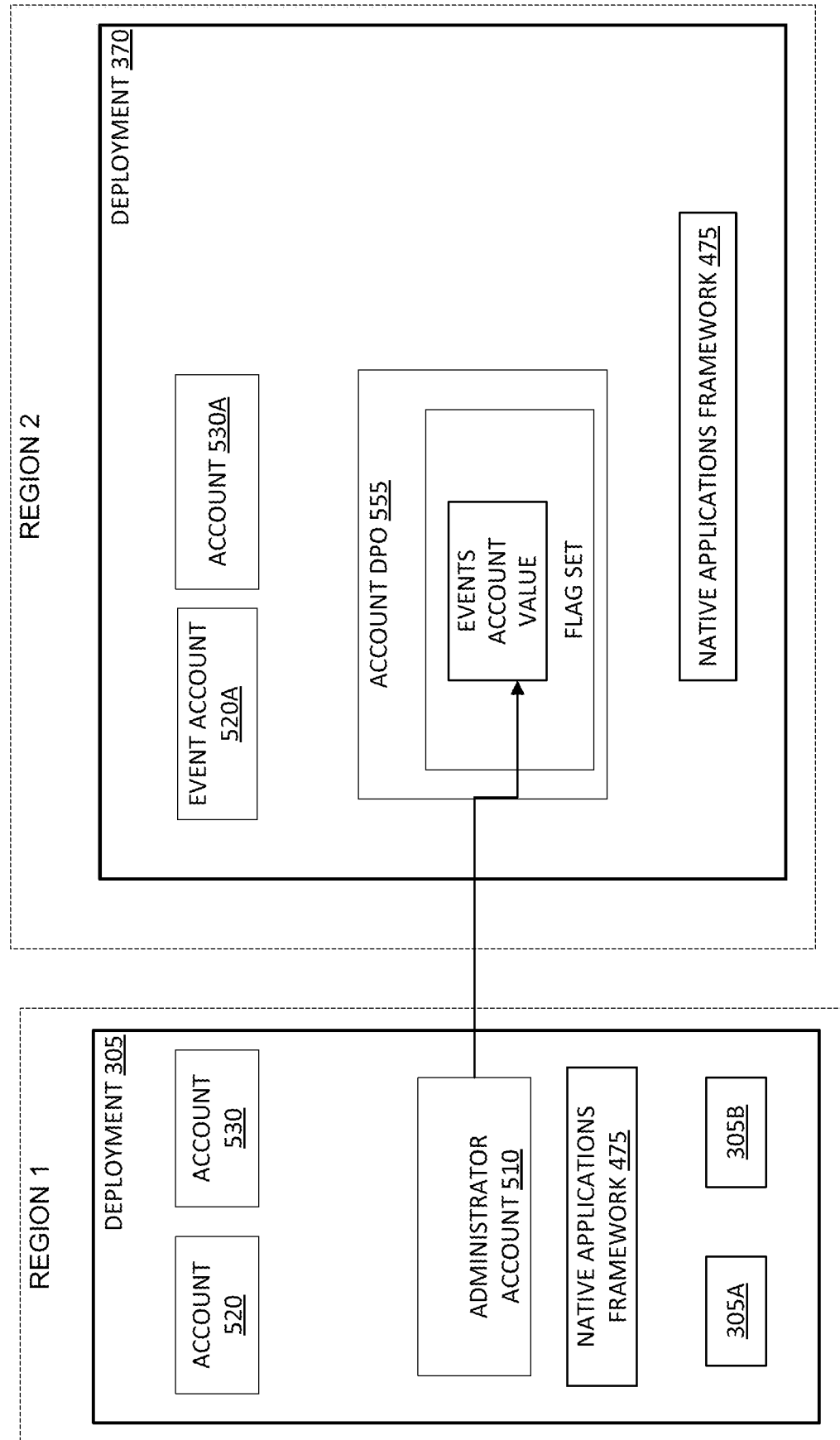
FIG. 7 is a block diagram of deployments of a data exchange, illustrating the use of a flag to designate an events account, in accordance with some embodiments of the present invention.

In some embodiments, the native applications framework 475 may utilize a new flag value to designate an account as an events account. More specifically as shown in FIG. 7, the account DPO 555 may include an existing flag set for the account 520 and may be modified to support a new flag value called e.g., events account. When the administrator account 510 wishes to designate account 520 as the events account, it may utilize a global message to add the events account value to the flag set of account DPO 520 global object. When the administrator account 510 wishes to un-designate the account 520 as the events account, it may utilize a global message to remove the events account value from the flag set of the account DPO 520 global object. It should be noted that this approach may also result in a small time window during which the system may not be able to resolve the events account.

In some embodiments, an organization's events account for each region may be stored in a map. The organization DPO (not shown) may be modified to include a new field e.g., "events account map", which may store a serialized JSON string of the map. The key of the map may be the region id, and the value may be a global entity reference. For example, assuming the "events account map" field provides "EventsAccountMap": "{1: \"1001,12345\", 2: \"1002, 6789\"}". It should be noted that this mapping format is for example purposes only and any appropriate format may be used. After deserializing, the map has two entries: account Y (id=12345) which is the events account in a first deployment (id=1001) in a first region (id=1) and account Y (id=6789) is the events account in a first deployment shard (id=1002) in a second region (id=2). When an account is un-designated as an events account, the native applications framework 475 may remove the entry from the map instead of the lazy cleanup approach implemented by other embodiments with respect to timestamps in account DPOs. When an account is designated as an events account, the native applications framework 475 may add an entry in the map or update an existing entry for the region if another account already has been set as events account. This approach does not have the drawbacks discussed with respect to the embodiments utilizing the events account flag value discussed hereinabove. From an implementation perspective, the native application framework 475 only needs to touch one DPO (i.e., the organization DPO) whenever designating or un-designating an events account, thereby simplifying the designating/un-designating process.

Figure 8:
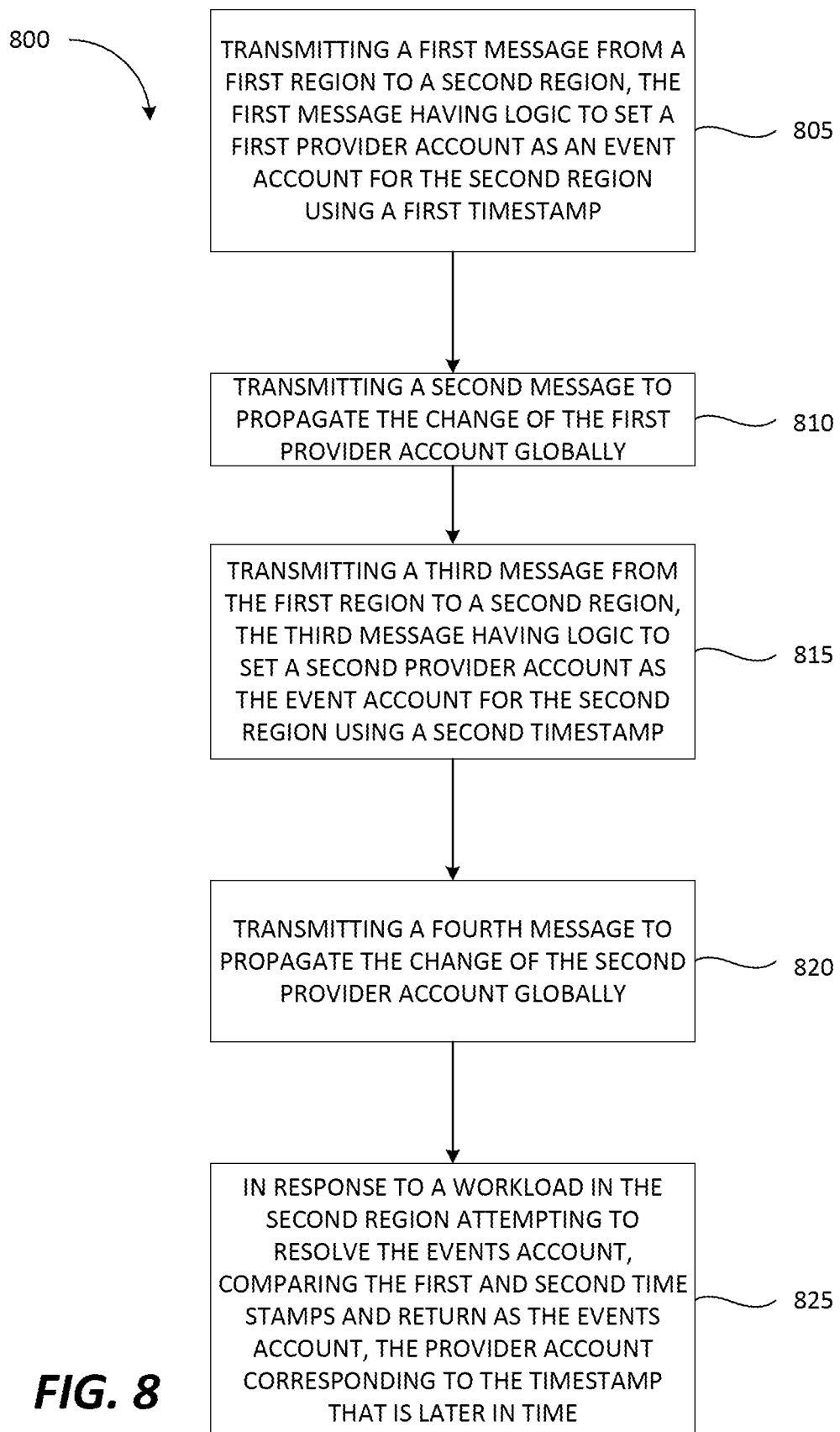
FIG. 8 is a block diagram of a method for implementing a region-specific events account that is used as a central place to store the events shared by consumers in that region, in accordance with some embodiments of the present invention.

FIG. 8 is a flow diagram of a method 800 for providing a region-specific events account that is used as a central place to store the events shared by consumers in that region, in accordance with some embodiments of the present disclosure. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 800 may be performed by cloud deployments 305 and 370 (illustrated in FIGS. 4 and 5A-5D).

Referring simultaneously to FIGS. 5A-5D, at block 805 the provider may wish to designate the account 520 as the event account for region 2, and (via the administrator account 510) may invoke a command to designate an account as an events account and specify account 520 as the account to be designated. As part of the command, the administrator account 510 may transmit a message (shown as GM1 in FIG. 5A) from region 1 to shard 550 in region 2 (where the account 520 resides). The message GM1 may be a global message (as discussed hereinabove) having logic to set the "EventsAccountSetOn" field of the account DPO 520 global object 555 to timestamp T1, corresponding to the current time (and thus setting account 520 as the event account for region 2). The logic of message GM1 may also immediately update the "EventsAccountSetOn" field of global representation 520A with the timestamp T1 to indicate that the account 520 has been designated the events account for region 2.

At block 810, the replication framework (not shown) of deployment 370 may subsequently transmit another global message (shown as GM2 in FIG. 5A) to region 1 and shard 560 in region 2. The message GM2 may include logic to propagate the change of account 520 to an event account globally. The message GM2 may update the "EventsAccountSetOn" fields of the global representation account 520C global object in region 1 and the global representation 520B in shard 560 of region 2 with the timestamp T1 to indicate that the account 520 has been designated the events account for region 2. Once message GM2 is received and processed in region 1 and region 2, the account DPO 520 global object is up to date.

It should be noted that GM1 may be referred to as a blocking operation such that the command to designate an account as an events account will wait until message GM1 is processed successfully before allowing any other operations to proceed. If the message GM1 fails or times out, the administrator account 510 can call the command to designate account 520 as an events account again until it is successful. However, because message GM2 is sent and handled by the replication framework of deployment 370 (and not the administrator account 510), it is not a blocking operation and thus there is a time window until the transmission and processing of message GM2 is complete during which the global representation 520B in shard 560 does not yet reflect the change to of account 520.

Referring to FIG. 5B, at block 815 the provider may now wish to designate account 530 as the event account for region 2 and may invoke the command to designate an account as an events account again, specifying account 530 this time. The provider (via the administrator account 510) may transmit message GM3 from region 1 to shard 560 in region 2 (where the account 530 resides). Like message GM1, the message GM3 may be a global message type having logic to set the "EventsAccountSetOn" field of the account DPO 530 global object 565 to timestamp T2, corresponding to the current time (and thus setting account 530 as the event account for region 2). The logic of message GM3 may also immediately update the "EventsAccountSetOn" field of the global representation 530B with the timestamp T2 to indicate that the account 530 has been designated as the events account for region 2. At block 820 the replication framework of deployment 370 may subsequently transmit another global message (shown as GM4 in the FIG. 5B) to region 1 and deployment shard 550 in region 2. The message GM4 may include logic to propagate the change of account 530 to an event account globally. The message GM4 may update the "EventsAccountSetOn" fields of the global representation account 530C global object in region 1 and the global representation 530A in shard 550 of region 2 with the timestamp T2 to indicate that the account 530 is the event account for region 2. Once message GM4 is received and processed in region 1 and region 2, the account DPO 530 global object is up to date.

As with message GM1, message GM3 may be a blocking operation such that the command to designate an account as an events account will wait until message GM3 is processed successfully before allowing any other operations to proceed. If the message GM3 fails or times out, the administrator account 510 can call the command to designate account 530 as an events account again until it is successful. However, because message GM4 is sent and handled by the replication framework of deployment 370 separately, it is not a blocking operation and thus there is a time window until the transmission and processing of message GM4 is complete during which the global representation 530A in shard 550 has not yet reflected the change to the account 530. During this time window, if a workload in shard 550 attempts to resolve the event account before the global representation 530A is updated, the account 520 is returned as the event account (because the global representation 530A does not have a timestamp). After message GM4 has been processed and the global representation 530A is updated, at block 825 if a workload in shard 550 attempts to resolve the events account, the deployment 370 may compare the time stamps T1 and T2 from global representation 520A and global representation 530A respectively and return account 530 as the event account as the global representation 530A's timestamp is later in time (i.e., T2 is later in time than T1).

It should be noted that the deployment 370 does not reset the "EventsAccountSetOn" field for account 520 in the account DPO 520 global object 555 until after the message GM4 has been processed as this helps to avoid the interruption of event sharing during the replication of global objects. As discussed herein, to update one or more global representations of an associated account DPO global object when an associated account DPO is updated, a global message is sent to remote deployments to inform them of the change to the associated account DPO, which is handled asynchronously. If the global representation account object resides in the same deployment as the updated account DPO global object, then it will be updated by the same message that updated the account DPO global object account DPO, and does not require a separate global message to be updated. As a result, regardless of whether the timestamp for account 520 is reset before or after setting the timestamp for account 530, there is no way to guarantee message GM4 will arrive or be processed before account 520's timestamp is reset. Thus, by resetting the "EventsAccountSetOn" field for account 520 in the account DPO 520 global object 555 before the message GM4 has been processed, there could be a time window during which the system may be unable to find an event account until message GM4 is processed which is undesirable.

When the provider wishes to remove an account's designation as the event account for a region, it may issue a command to each deployment of that region to remove the current events account's designation as the event account. In response, each deployment of that region may scan every global representation (global account object replica) therein and identify (based on the "EventsAccountSetOn" field for each global representation) all accounts that have a timestamp that is less recent than the timestamp of the current events account for the region. Each deployment of the region may group all the accounts identified in this way, and the administrator account 510 may transmit a global message to each deployment to reset the "EventsAccountSetOn" field of those accounts.

Referring to FIG. 5C, at a third time (T3), the provider may call a command to remove account 530's designation as the event account for region 2. In response to the command to remove account 530's designation as the event account for region 2, the deployment 370 may scan each global representation and (based on the "EventsAccountSetOn" field for each global representation) identify all accounts that have a timestamp that is less recent than the timestamp of the current event account (in this case, T2 for account 530). The deployment 370 may then group these accounts. In the example of FIG. 5C, only the account 520 has a timestamp (T1) that is less recent than the timestamp of account 530 (T2). Thus, the provider (via the administrator account 510) may issue a message GM5 (which may be a global message type) from region 1 to shard 550 in region 2 where account 520 resides. The logic of the message GM5 may reset the "EventsAccountSetOn" fields of the account DPO 520 global object 555 and the global representation 520A to 0.

The replication framework of deployment 370 may send a subsequent message GM6 (shown as GM6 in FIG. 5C) having a global message type to region 1 and shard 560 in region 2. The logic of message GM6 may propagate the change of account 520 globally. After message GM6 is processed in region 1 and region 2, the global account DPO 520 global object for account 520 may be up to date. Referring to FIG. 5D, once message GM5 successfully completes, the provider (via administrator account 510) may transmit a message GM7 having a global message type from region 1 to shard 560 in region 2 where the account 530 resides. The logic of the message GM7 may reset the "EventsAccountSetOn" fields of the account DPO 530 global object 565 corresponding to account 530 and the global representation 530B to 0. The replication framework of deployment 370 may send a subsequent message GM8 having a global message type to region 1 and shard 550 in region 2. The logic of message GM8 may propagate the change of account 530 globally by resetting the "EventsAccountSetOn" fields of the global representation account 530C global object and the global representation 530A to 0. After message GM8 is processed in region 1 and region 2, the global account DPOobject for account 530 global object may be up to date.

It should be noted that message GM5 and message GM7 are both blocking operations, and thus if they fail or timeout, the administrator account 510 can call the command to un-designate account 530 again and again until it is successful. In addition, message GM7 (which resets the status of account 530) must be sent after message GM5 has been successfully processed, otherwise it is possible that workloads in shard 550 will resolve account 520 as the events account for region 2, which is not undesirable.

Because message GM6 and message GM8 are handled separately by the replication framework of deployment 370, there is a time window during which workloads will see the account 530 as the events account in shard 550 and account 520 as the events account in shard 560. However, because the "EventsAccountSetOn" field in the respective account DPO global objects of accounts 520 and 530 has been reset, the deployment 370 can avoid mistakenly forwarding any events/execution information by checking the "EventsAccountSetOn" field of each account DPO global object during the resolution of the event table stage of the account. If the deployment 370 determines there is a zero value in the "EventsAccountSetOn" field, it can stop right before copying events files from the consumer stage to the provider stage.

Figure 9:
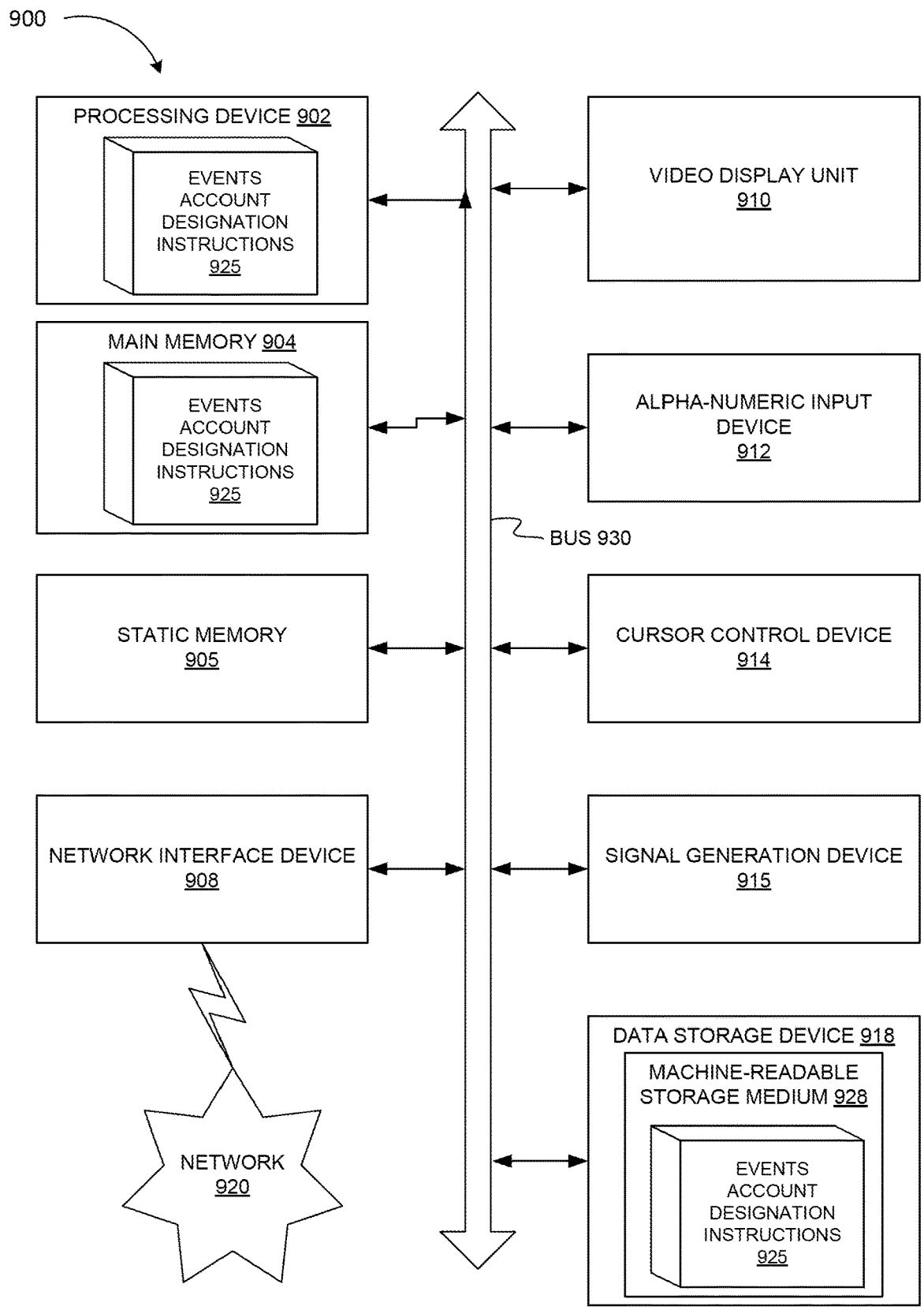
FIG. 9 is a block diagram of an example computing device that may perform one or more of the operations described herein, in accordance with some embodiments of the present invention.

As discussed herein, each account (whether provider or consumer) of the deployment 305 may include an event table which may be used to store execution information generated by applications they are sharing or consuming. Referring to FIG. 6, once the provider has designated an account (e.g., account 520) as the event account for region 2 as discussed hereinabove, whenever the consumer account 350 (or any consumer account in region 2) calls the application 445, the native applications framework 475 may facilitate the ingestion and storage of execution information into an event table 630 of the event account 520. T FIG. 9 illustrates a diagrammatic representation of a machine in the example form of a computer system 900 within which a set of instructions, for causing the machine to perform any one or more of the methodologies discussed herein for utilizing region specific events accounts to share execution information regarding usage of native applications.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may be representative of a server.

The exemplary computer system 900 includes a processing device 902, a main memory 904 (e.g., read-only memory (ROM), flash memory, dynamic random access memory (DRAM)), a static memory 905 (e.g., flash memory, static random access memory (SRAM), etc.), and a data storage device 918, which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 900 may further include a network interface device 908 which may communicate with a network 920. The computing device 900 also may include a video display unit 910 (e.g., a liquid crystal display (LCD) or a cathode ray tube (CRT)), an alpha-numeric input device 912 (e.g., a keyboard), a cursor control device 914 (e.g., a mouse) and an acoustic signal generation device 915 (e.g., a speaker). In one embodiment, video display unit 910, alphanumeric input device 912, and cursor control device 914 may be combined into a single component or device (e.g., an LCD touch screen).

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute events account designation instructions 925, for performing the operations and steps discussed herein.

The data storage device 918 may include a machine-readable storage medium 928, on which is stored one or more sets of events account designation instructions 925 (e.g., software) embodying any one or more of the methodologies of functions described herein. The events account designation instructions 925 may also reside, completely or at least partially, within the main memory 904 or within the processing device 902 during execution thereof by the computer system 900; the main memory 904 and the processing device 902 also constituting machine-readable storage media. The events account designation instructions 925 may further be transmitted or received over a network 920 via the network interface device 908.

While the machine-readable storage medium 928 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "granting," "determining," "publishing," "providing," "designating," "encoding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:
1. A method comprising:
for each of a set of provider accounts in a first region, replicating a global account object corresponding to the provider account to a second region to establish a replicated global account object in the second region;

transmitting to the second region, a first message to designate a first provider account of the set of provider accounts as an events account of the second region by:
modifying, by a processing device, an account data persistence object (DPO) of the first provider account to designate the first provider account as the events account, wherein the events account is a central location within the second region where execution information generated by execution of applications shared with consumer accounts in the second region is stored; and
updating the replicated global account object corresponding to the first provider account to designate the first provider account as the events account; and
transmitting a second message to the first region to update a status of the global account object corresponding to the first provider account as the events account.

2. The method of claim 1, further comprising:
executing, by a consumer account of the second region, an application shared by a provider; and
storing, in the replicated global account object corresponding to the first provider account, first execution information generated from the execution of the application by the consumer account of the second region.

3. The method of claim 1, wherein modifying the account DPO comprises:
updating an entry of the account DPO corresponding to the first provider account with a first timestamp indicating a current time.

4. The method of claim 1, wherein updating the replicated global account object corresponding to the first provider account comprises:
updating an entry of the replicated global account object corresponding to the first provider account with a first timestamp indicating a current time.

5. The method of claim 1, further comprising:
transmitting to the second region, a third message to designate a second provider account of the set of provider accounts as the events account by:
updating an entry of an account DPO corresponding to the second provider account with a second timestamp indicating a new current time to designate the second provider account as the events account;
updating an entry of the replicated global account object corresponding to the second provider account with the second timestamp indicating the new current time; and
transmitting a fourth message to the first region to update a status of the global account object corresponding to the second provider account as the events account.

6. The method of claim 5, further comprising:
in response to a workload executing in the second region attempting to resolve the events account, comparing the first and second timestamps; and
in response to determining that the second timestamp is later in time, resolving the second provider account as the events account.

7. The method of claim 5, further comprising:
in response to a request to remove the second provider account's designation as the events account, scanning each replicated global account object to identify each provider account having a timestamp that is less recent than the second time stamp;
grouping each identified provider account;
transmitting a fifth message to reset an entry of the account DPO corresponding to the first provider account to zero and reset an entry of the replicated global account object corresponding to the first provider account to zero; and
transmitting a sixth message to the first region to update the status of the global account object corresponding to the first provider account as not the events account.

8. The method of claim 7, further comprising:
transmitting a seventh message to reset an entry of the account DPO corresponding to the second provider account to zero and reset an entry of the replicated global account object corresponding to the second provider account to zero; and
transmitting an eighth message to the first region to update the status of the global account object corresponding to the second provider account as not the events account.

9. A system comprising:
a memory; and
a processing device operatively coupled to the memory, the processing device to:
for each of a set of provider accounts in a first region, replicate a global account object corresponding to the provider account to a second region to establish a replicated global account object in the second region;
transmit to the second region, a first message to designate a first provider account of the set of provider accounts as an events account of the second region by:
modify an account data persistence object (DPO) of the first provider account to designate the first provider account as the events account, wherein the events account is a central location within the second region where execution information generated by execution of applications shared with consumer accounts in the second region is stored; and
update the replicated global account object corresponding to the first provider account to designate the first provider account as the events account; and
transmit a second message to the first region to update a status of the global account object corresponding to the first provider account as the events account.

10. The system of claim 9, wherein the processing device is further to:
execute, by a consumer account of the second region, an application shared by a provider; and
store, in the replicated global account object corresponding to the first provider account, first execution information generated from the execution of the application by the consumer account of the second region.

11. The system of claim 9, wherein to modify the account DPO, the processing device is to:
update an entry of the account DPO corresponding to the first provider account with a first timestamp indicating a current time.

12. The system of claim 9, wherein to update the replicated global account object corresponding to the first provider account, the processing device is to:
update an entry of the replicated global account object corresponding to the first provider account with a first timestamp indicating a current time.

13. The system of claim 9, wherein the processing device is further to:

transmit to the second region, a third message to designate a second provider account of the set of provider accounts as the events account by:
  updating an entry of an account DPO corresponding to the second provider account with a second timestamp indicating a new current time to designate the second provider account as the events account;
  updating an entry of the replicated global account object corresponding to the second provider account with the second timestamp indicating the new current time; and
  transmitting a fourth message to the first region to update a status of the global account object corresponding to the second provider account as the events account.

14. The system of claim 13, wherein the processing device is further to:
  in response to a workload executing in the second region attempting to resolve the events account, compare the first and second timestamps; and
  in response to determining that the second timestamp is later in time, resolve the second provider account as the events account.

15. The system of claim 13, wherein the processing device is further to:
  in response to a request to remove the second provider account's designation as the events account, scan each replicated global account object to identify each provider account having a timestamp that is less recent than the second time stamp;
  group each identified provider account;
  transmit a fifth message to reset an entry of the account DPO corresponding to the first provider account to zero and reset an entry of the replicated global account object corresponding to the first provider account to zero; and
  transmit a sixth message to the first region to update the status of the global account object corresponding to the first provider account as not the events account.

16. The system of claim 15, wherein the processing device is further to:
  transmit a seventh message to reset an entry of the account DPO corresponding to the second provider account to zero and reset an entry of the replicated global account object corresponding to the second provider account to zero; and
  transmit an eighth message to the first region to update the status of the global account object corresponding to the second provider account as not the events account.

17. A non-transitory computer-readable medium having instructions stored thereon which, when executed by a processing device, cause the processing device to:
  for each of a set of provider accounts in a first region, replicate a global account object corresponding to the provider account to a second region to establish a replicated global account object in the second region;
  transmit to the second region, a first message to designate a first provider account of the set of provider accounts as an events account of the second region by:
    modify, by the processing device, an account data persistence object (DPO) of the first provider account to designate the first provider account as the events account, wherein the events account is a central location within the second region where execution information generated by execution of applications shared with consumer accounts in the second region is stored; and
    update the replicated global account object corresponding to the first provider account to designate the first provider account as the events account; and
  transmit a second message to the first region to update a status of the global account object corresponding to the first provider account as the events account.

18. The non-transitory computer-readable medium of claim 17, wherein the processing device is further to:
  execute, by a consumer account of the second region, an application shared by a provider; and
  store, in the replicated global account object corresponding to the first provider account, first execution information generated from the execution of the application by the consumer account of the second region.

19. The non-transitory computer-readable medium of claim 17, wherein to modify the account DPO, the processing device is to:
  update an entry of the account DPO corresponding to the first provider account with a first timestamp indicating a current time.

20. The non-transitory computer-readable medium of claim 17, wherein to update the replicated global account object corresponding to the first provider account, the processing device is to:
  update an entry of the replicated global account object corresponding to the first provider account with a first timestamp indicating a current time.

21. The non-transitory computer-readable medium of claim 17, wherein the processing device is further to:
  transmit to the second region, a third message to designate a second provider account of the set of provider accounts as the events account by:
    updating an entry of an account DPO corresponding to the second provider account with a second timestamp indicating a new current time to designate the second provider account as the events account;
    updating an entry of the replicated global account object corresponding to the second provider account with the second timestamp indicating the new current time; and
    transmitting a fourth message to the first region to update a status of the global account object corresponding to the second provider account as the events account.

22. The non-transitory computer-readable medium of claim 21, wherein the processing device is further to:
  in response to a workload executing in the second region attempting to resolve the events account, compare the first and second timestamps; and
  in response to determining that the second timestamp is later in time, resolve the second provider account as the events account.

23. The non-transitory computer-readable medium of claim 21, wherein the processing device is further to:
  in response to a request to remove the second provider account's designation as the events account, scan each replicated global account object to identify each provider account having a timestamp that is less recent than the second time stamp;
  group each identified provider account;
  transmit a fifth message to reset an entry of the account DPO corresponding to the first provider account to zero and reset an entry of the replicated global account object corresponding to the first provider account to zero; and transmit a sixth message to the first region to update the status of the global account object corresponding to the first provider account as not the events account.

24. The non-transitory computer-readable medium of claim 23, wherein the processing device is further to:

transmit a seventh message to reset an entry of the account DPO corresponding to the second provider account to zero and reset an entry of the replicated global account object corresponding to the second provider account to zero; and transmit an eighth message to the first region to update the status of the global account object corresponding to the second provider account as not the events account.

\* \* \* \* \*